United States Patent [19]
Watanabe et al.

[11] Patent Number: 5,513,036
[45] Date of Patent: Apr. 30, 1996

[54] PROJECTION SCREEN

[75] Inventors: Hitomu Watanabe; Makoto Honda; Hiroshi Kojima; Satoshi Nakamae, all of Tokyo, Japan

[73] Assignee: Dai Nippon Printing Co., Ltd., Japan

[21] Appl. No.: 297,822

[22] Filed: Aug. 30, 1994

[30] Foreign Application Priority Data

Aug. 31, 1993 [JP] Japan .................................. 5-237146

[51] Int. Cl.⁶ .................................................. G03B 21/28
[52] U.S. Cl. ......................... 359/457; 359/456; 359/455; 359/460; 353/77
[58] Field of Search ............................ 353/77; 359/456, 359/457, 455, 460

[56] References Cited

U.S. PATENT DOCUMENTS 5,408,282  4/1985  Nagashima et al. ..................... 353/77

FOREIGN PATENT DOCUMENTS 59-15925  1/1984  Japan .

Primary Examiner—Michael L. Gellner
Assistant Examiner—D. P. Malley
Attorney, Agent, or Firm—Parkhurst, Wendel & Burr

[57] ABSTRACT

In a projection screen for a rear projection type television set, three lens sheets are arranged in the order of a lenticular lens sheet, a linear Fresnel lens sheet, and a circular Fresnel lens sheet when seen from a viewer's side toward a projector tube. As compared with the arrangement in which the linear and circular Fresnel lens sheets are exchanged with each other, it is possible to obtain a higher brightness and a more uniform brightness, and color uniformity in the picture plane. Further, when the light incident surface of the linear Fresnel lens sheet is matted, it is possible to eliminate white bands (seen from the viewer's side) effectively.

9 Claims, 22 Drawing Sheets

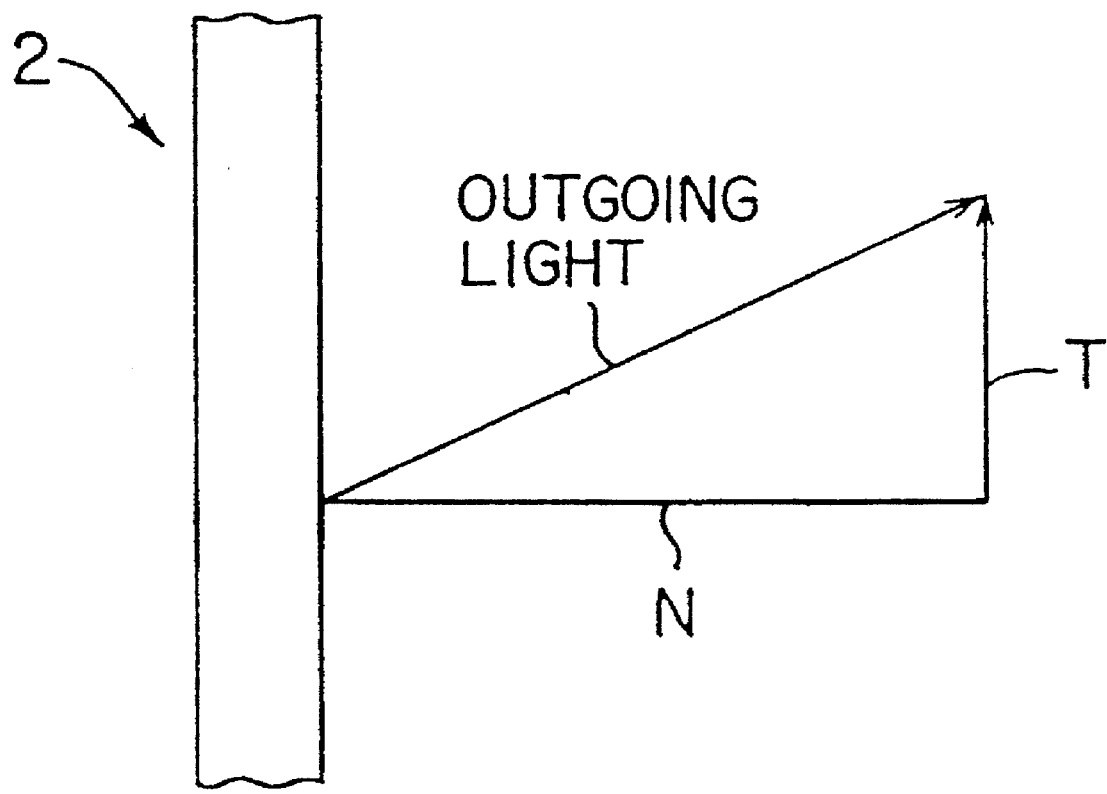
F I G. 14

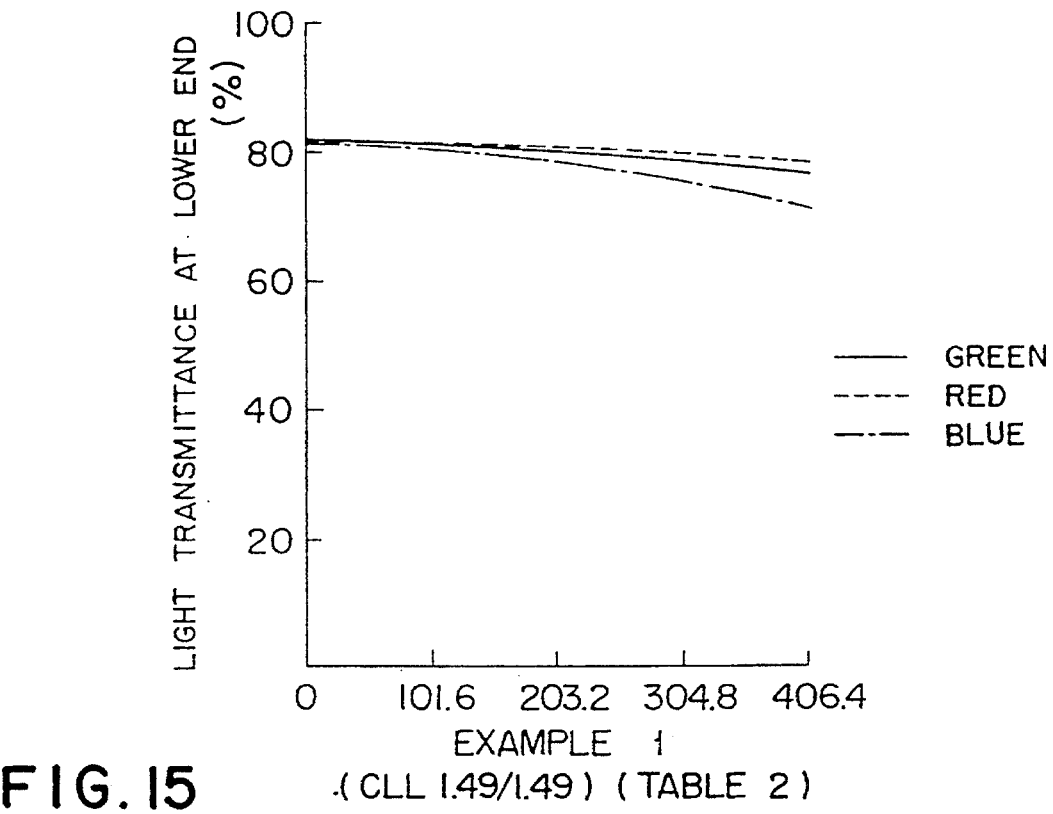
FIG. 15  EXAMPLE 1 (CLL 1.49/1.49) (TABLE 2)
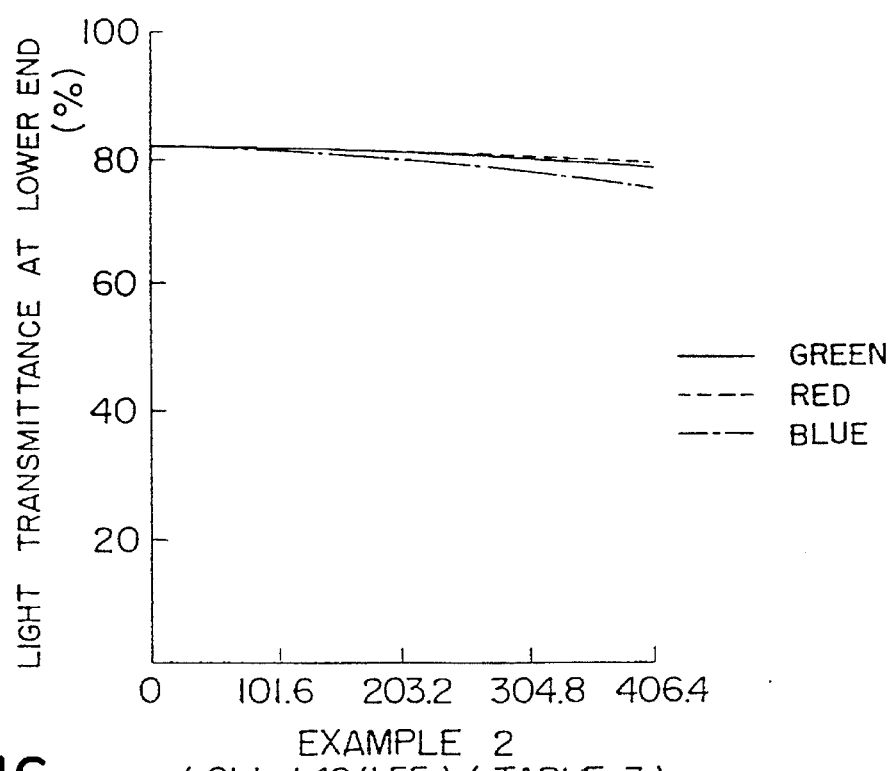
FIG. 16  EXAMPLE 2 (CLL 1.49/1.55) (TABLE 3)

PROJECTION SCREEN

BACKGROUND OF THE INVENTION

The present invention relates to a projection screen used for a rear projection type television set.

Conventional projection screens used for rear projection type television sets have been composed of a circular Fresnel lens sheet and a lenticular lens sheet. The circular Fresnel lens sheet is formed by arranging a great number of circular unit lenses on a plane in such a way that the apex lines of the lenses form concentric circles. This lens sheet has a function of converging the projected light toward the viewer side. The lenticular lens sheet is formed by arranging a great number of linear unit lenses on a plane in such a way that the longitudinal lines of the lenses form parallel lines. This lens sheet has a function of diffusing the projected light to form an image.

Further, in the projector optical system of the conventional rear projection type television sets, the projector tube has been so far mainly arranged on the central axis of the screen rear surface. Recently, however, another projector arranging method has been developed to make the television set compact. In this case, the projector tube is arranged in a limited space offset from the central axis of the screen surface, for instance over or under the screen.

The present invention relates to an improvement of the so-called table top type projection screen, which is suitable for use with the rear projection type television set. In this table top projection screen for a rear projection television set, since the screen lower portion can be fairly shortened as compared with that of the ordinary rear projection television set, it is possible to give the viewers such an impression as if they were seeing a direct viewing CRT television set. In this screen, a linear Fresnel lens sheet is further arranged near the rear surface (on the projector tube side) of the circular Fresnel lens sheet for correction of the optical axis of the projection screen. That is, in order to correct the offset position of the projector tube, the optical axis is corrected to some extent, before the light is allowed to be incident upon the circular Fresnel lens sheet. Here, the reason why the linear Fresnel lens sheet is used is as follows: since the linear Fresnel lens sheet is formed by arranging a great number of prism-shaped unit lenses on a plane in such a way that the longitudinal lines thereof are arranged in parallel to each other, it is possible to change the directional relationship between the incident light and the outgoing light.

The above-mentioned technique of adding the linear Fresnel lens sheet has been proposed by Japanese Published Unexamined (Kokai) Patent Application No. 59-15925 (issued on Jan. 27, in 1984). In this prior art, a linear Fresnel lens sheet is arranged on the projection side of the circular Fresnel lens sheet (the screen). In other words, the sheets are arranged in the order of the circular Fresnel lens sheet and the linear Fresnel lens sheet when seen from the viewer side. Further, the light is allowed to be incident upon the projection screen at a predetermined inclination angle with respect to the screen (without allowing the light to be incident upon the screen in parallel to the optical axis thereof), by designing the inclination angle of the lens surfaces arranged on the linear Fresnel lens sheet at an appropriate angle, in order to reduce the depth of the projector system, that is, the thickness of the projection type television set.

In the above-mentioned prior art technique, the linear Fresnel lens sheet is additionally provided, so that it has become possible to change the angle of the optical axis of the incident light with respect to the normal line to the screen surface, but there arises another problem in that the picture brightness is inevitably lowered.

SUMMARY OF THE INVENTION

Accordingly, it is the object of the present invention to provide a projection screen, by which the optical axis of the incident light can be adjusted at any desired angle with respect to the normal line to the screen surface, without reducing the picture brightness and without causing any brightness and color non-uniformity at different positions on a plane.

To achieve the above-mentioned object, the present invention provides a projection screen for a rear projection type television set, having a plurality of lens sheets, wherein the lens sheets are arranged in the order of a lenticular lens sheet, a linear Fresnel lens sheet, and a circular Fresnel lens sheet when seen from a viewer side.

The other objects, features and effects of the present invention will be more clarified by the following description of the invention with reference to the attached drawings.

BRIEF DESCRIPTION OF THE DRAWINGS

FIG. 14 is a view explanatory of how the outgoing light angles shown in FIGS. 10 to 13 are defined;

FIG. 15 is a graphical representation of a light utilization rate corresponding to Example 1;

FIG. 16 is a graphical representation similar to FIG. 15 but corresponding to Example 2;

DESCRIPTION OF THE PREFERRED EMBODIMENTS

Figure 1:
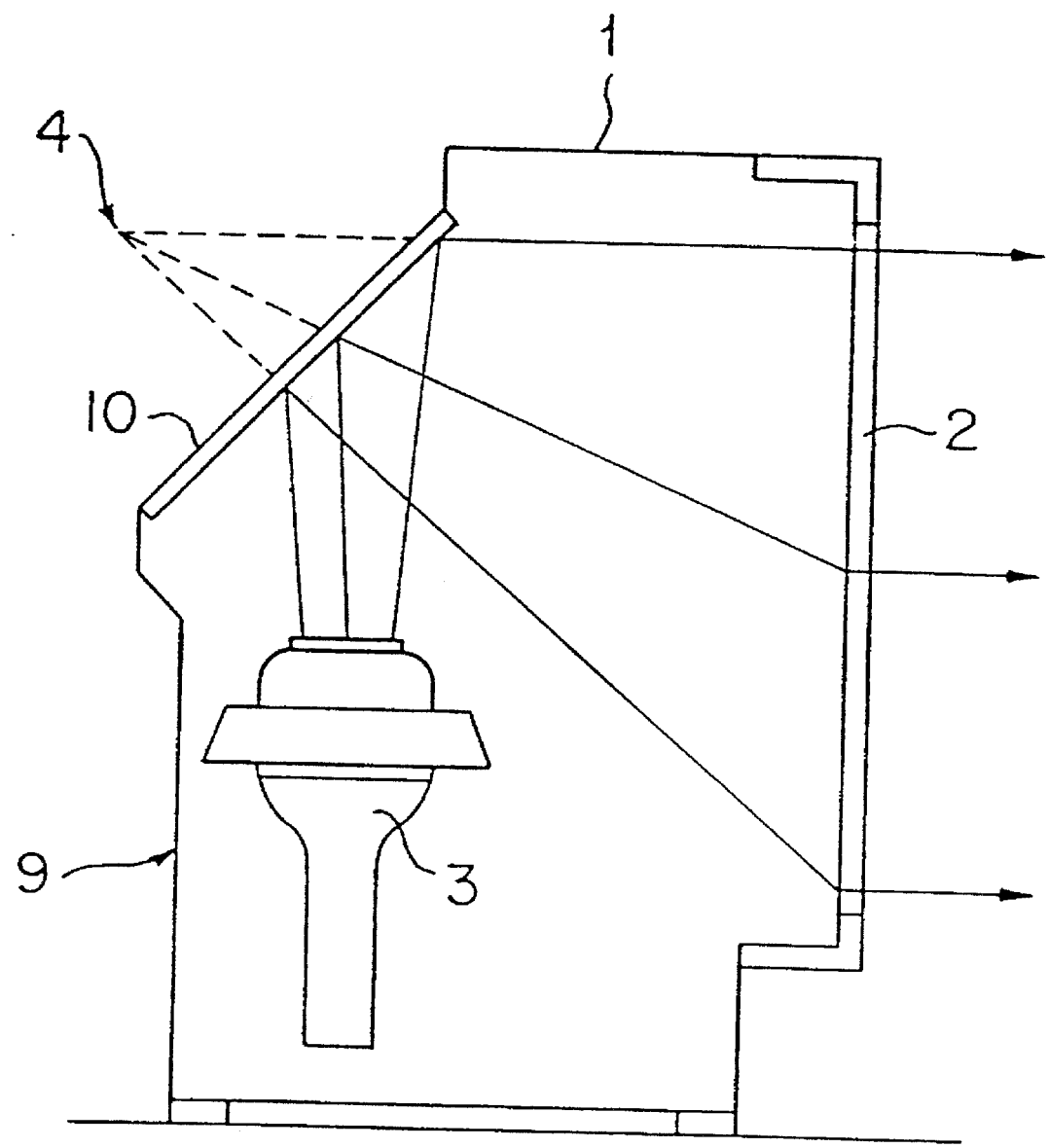
FIG. 1 is an diagrammatical view showing an optical system of the rear projection type television set using the projection screen according to the present invention.

FIG. 1 shows a rear projection type television set 1 provided with a projection screen 2 of the present invention. The TV set 1 has a casing 9 for supporting the projection screen 2 in the vertical direction. In this casing 9, a projector tube (e.g., CRT) 3 is disposed. To make the TV set 1 compact, the optical axis of the projector tube 3 is determined to be offset from the optical axis of the projection screen 2 at a predetermined angle. That is, the optical axis of the projector tube 3 is set in the vertical direction. Therefore, the projection light outgoing from the projector tube 3 in the vertical direction is reflected by an inner reflection surface of an inclined mirror 10, and then projected onto an inner surface of the projection screen 2 along a downward oblique optical axis as shown.

Figure 2:
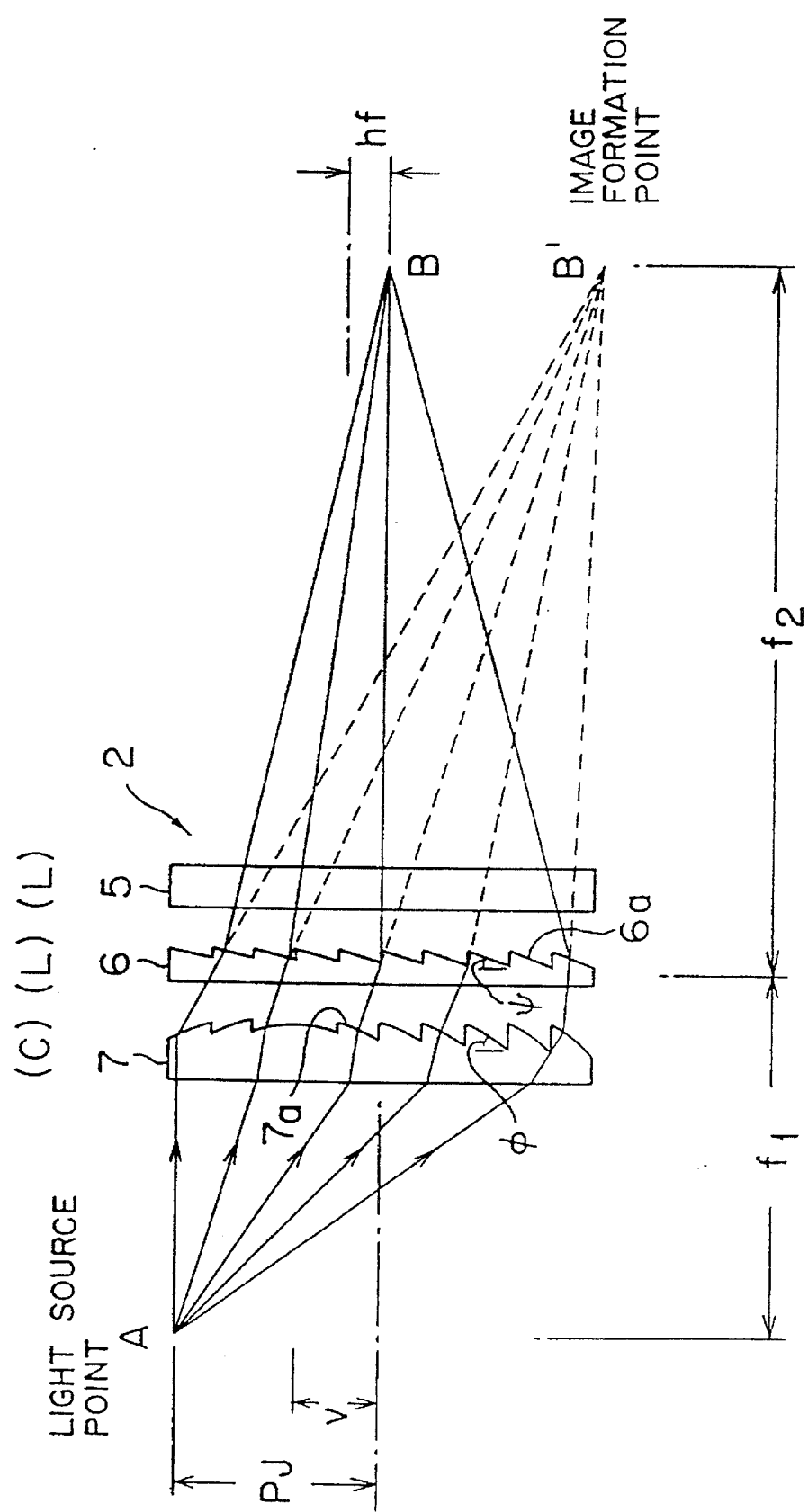
FIG. 2 is an illustration for assistance in explaining a method of calculating the lens angle of the linear Fresnel lens sheet used for the projection screen (CLL arrangement) according to the present invention.
Figure 3:
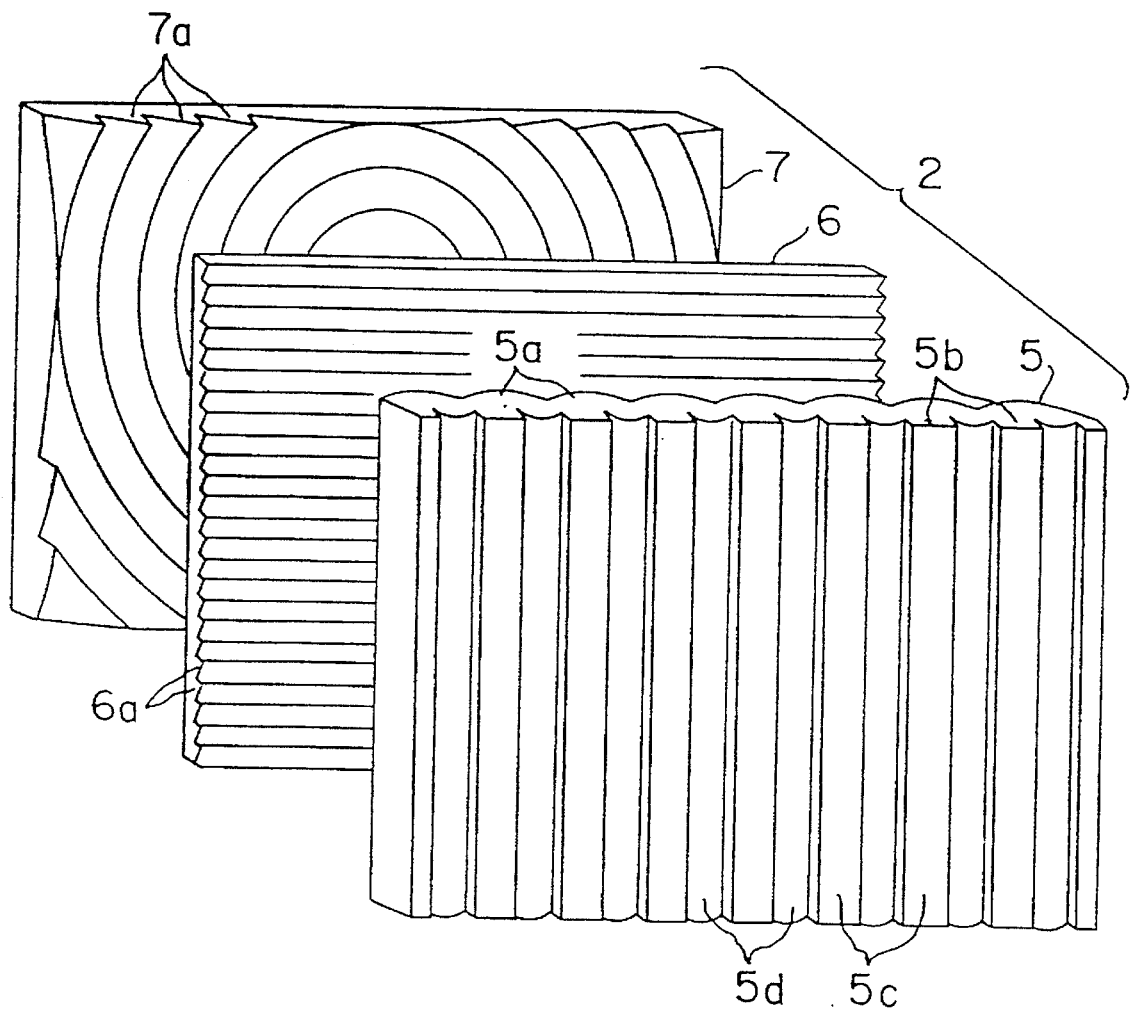
FIG. 3 is a perspective view showing the projection screen according to the present invention.

As shown in FIGS. 2 and 3, the projection screen 2 according to the present invention is composed of at least three lens sheets of circular Fresnel lens sheet (CFS) 7, a linear Fresnel lens sheet (LFS) 6 and a lenticular lens sheet (LLS) 5, which are arranged in sequence when seen from the projector tube side. Further, as shown in FIG. 3, the circular Fresnel lens sheet 7 and the linear Fresnel lens sheet 6 are all arranged in such a way that the respective Fresnel lens forming surfaces are directed toward the viewer side (the light outgoing side).

As is well known, the circular Fresnel lens sheet 7 is a sheet on one surface of which a number of circular prism-shaped lenses (ribs) 7a are arranged concentrically. On the other hand, the linear Fresnel lens sheet 6 is a sheet on one surface of which a number of long prism-shaped lenses (ribs) 6a are arranged in parallel to each other extending in the horizontal direction. Further, in an example shown in FIG. 3, the lenticular lens sheet 5 has on one surface thereof facing the projector tube 3 a number of parallel-arranged lenticular lenses 5a extending in the vertical direction and on the other surface facing the viewer side a number of parallel-arranged square-shaped protrusions 5b extending in the vertical direction. The protrusions 5b are disposed in areas in which light that has passed through the raised stripes 5a does not arrive. The surfaces of the square-shaped protrusions 5b are formed flat, and coated with a light absorbing layer 5c, respectively. Lenticular lenses 5d are also provided between adjacent protrusions 5b.

Figure 4:
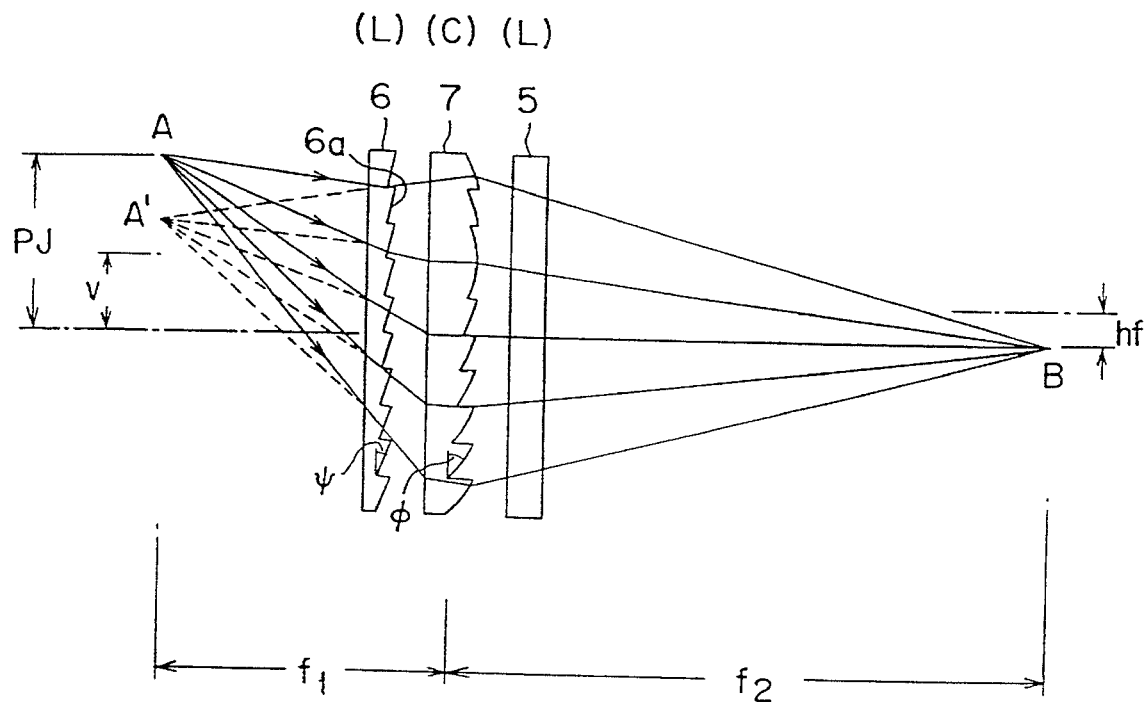
FIG. 4 is an illustration for assistance in explaining a method of calculating the lens angle of the linear Fresnel lens sheet used for the prior art projection screen (LCL arrangement)

FIG. 4 shows a prior art arrangement of the lenticular lens sheet 5, the linear Fresnel lens sheet 6 and the circular Fresnel lens sheet 7. In this prior art sheet arrangement, since the circular Fresnel lens sheet (CFS) 7 is arranged between the linear Fresnel lens sheet (LFS) 6 and the lenticular lens sheet (LLS) 5, this sheet arrangement is referred to as "LCL" arrangement on the basis of the respective initial letters of these sheets.

In contrast with this, in the present invention, as already explained with reference to FIG. 3, these sheets are arranged in the order of the circular Fresnel lens sheet (CFS) 7, the linear Fresnel lens sheet (LFS) 6 and the lenticular lens sheet (LLS) 5 from the projector tube side to the viewer side. This sheet arrangement is referred to as "CLL" arrangement on the basis of the respective initial letters of these sheets.

In the case of the circular Fresnel lens sheet 7, when light is allowed to be incident from a point (a light source) located on the central axis upon the surface thereof, the vertical component angles of the outgoing light on the same horizontal coordinate are mostly equal to each other at various horizontal coordinate positions of the lens sheet 7. In the same way, the horizontal component angles of the outgoing light on the same vertical coordinate are mostly equal to each other at various vertical coordinate positions of the lens sheet 7. In the case of the linear Fresnel lens sheet 6, the above-mentioned uniformity in the angles of the outgoing light cannot be established over the surface of the lens sheet 6.

Further, when the light are allowed to be incident from a point offset from the central axis upon the surface thereof, the above-mentioned uniformity cannot be established even in the circular Fresnel lens sheet 7. However, the deviation of the uniformity in the angles of the outgoing light of the circular Fresnel lens sheet 7 is smaller than that of the linear Fresnel lens sheet 6.

Therefore, in the prior art "LCL" arrangement such that the three sheets are arranged in the order of the linear Fresnel lens sheet 6, the circular Fresnel lens sheet 7 and the lenticular lens sheet 5 (as shown in FIG. 4), when the optical axis of the projector is required to be corrected on the basis of the linear Fresnel lens sheet 6, there arises a considerably large difference in the vertical angle of the outgoing light (toward the right side in FIG. 4) between the central portion and both the left and right end portions of the sheet surface of the linear Fresnel lens sheet 6. In contrast with this, in the present invention, as shown in FIG. 2, since the three sheets are arranged in the order of the circular Fresnel lens sheet 7, the linear Fresnel lens sheet 6 and the lenticular lens sheet 5 (i.e., "CLL" arrangement), it is possible to reduce the above-mentioned difference.

In other words, in the projection screen of the present invention, since the sheet arrangement is the "CLL" arrangement, when the incident light axis is changed to any desired angle with respect to the normal line to the screen surface, it is possible to reduce a drop of the picture brightness and the difference of brightness in the screen plane.

To adjust the optical axis, various methods may be taken into account such that the optical center of the circular Fresnel lens sheet 7 is decentering or offset from the mechanical center thereof; only the linear Fresnel lens sheet 6 is offset; or both the lens sheets are offset in combination. However, when only the circular Fresnel lens sheet 7 is offset, there arises a problem in that the brightness increases in the upper side of the projection screen 2 (near the light source) and decreases in the lower side thereof. On the other hand, when only the linear Fresnel lens sheet 6 is corrected or adjusted, conversely the upper side of the screen becomes dark and the lower side thereof becomes bright.

Accordingly, it is preferable to combine the optical axis corrections or adjustments based upon the linear and circular Fresnel lens sheets 6 and 7. When the optical axis adjustments by both the methods are combined appropriately, it is possible to obtained the uniform brightness on both the upper and lower ends of the screen.

The linear Fresnel lens sheet 6 used in the present invention is employed for correction of the optical system. For this purpose, the lens angle is changed non-linearly in the vertical direction of the projection screen. Further, an extreme value may be present according to the optical system.

FIG. 2 shows a method of calculating the beam locus of the linear Fresnel lens sheet 6 of the "CLL" arrangement, and FIG. 4 shows a method of calculating the beam locus of the linear Fresnel lens sheet 6 of the "LCL" arrangement. Here, when a light source point A is offset vertically from the central axis of the projection screen 2, the lens inclination angles are calculated so that an image formation point B' of the light source A may be corrected to a point B in the case of the "CLL" arrangement as shown in FIG. 2. On the other hand, the inclination lens angles are calculated so that a light source point A' may be corrected to a point A in the case of the "LCL" arrangement, as shown in FIG. 4.

Figure 5:
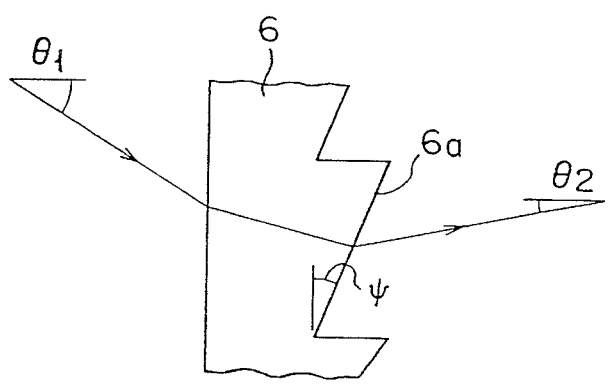
FIG. 5 is an illustration showing a locus of a light beam incident upon the linear Fresnel lens sheet.

The method of calculating the lens angle $\psi$ of the linear Fresnel lens sheet 6 as shown in FIG. 5 will be explained hereinbelow. Here, the symbols used are:

$\theta_1$: Incident light angle $\theta_2$: Outgoing light angle $\psi$: Linear Fresnel lens angle $n_L$: Liner Fresnel lens refractive index $\phi$: Circular Fresnel lens angle $v$: Vertical coordinate value of linear Fresnel lens $n_c$: Circular Fresnel lens refractive index $f_1$: Projection distance $f_2$: Vertical light convergent distance PJ: Vertical coordinate value of light source (A) (CRT)

$h_f$: Vertical coordinate value of image formation point

The lens angle $\psi$ of the linear Fresnel lens sheet 6 can be calculated on the basis of the incoming light angle $\theta_1$ and the outgoing light angle $\theta_2$ as follows:

$$\tan \psi = (\sin \theta_1 - \sin \theta_2) / \quad (1)$$
$$((n_L^2 - (\sin \theta_1)^2)^{1/2} - \cos \theta_2)$$

In the above expression (1), the incident light angle $\theta_1$ and the outgoing light angle $\theta_2$ are different between the "CLL" and "LCL" arrangements. That is, in the case of the "CLL" arrangement as shown in FIG. 2, the angle of the rightwardly outgoing light from the circular Fresnel lens sheet 7 is the incoming light angle $\theta_1$ to the linear Fresnel lens sheet 6, and the angle of the convergent light to the point B is the outgoing light angle $\theta_2$. Therefore, when S is expressed as:

$$S = ((v - PJ) \cos \phi)/(f_1^2 + (v - PJ)^2)^{1/2}) - \quad (2)$$
$$(\sin \phi) \; (n_c^2 - (v - PJ)^2/(f_1^2 + (v - PJ)^2))^{1/2}$$

The incident light angle $\theta_1$ and the outgoing light angle $\theta_2$ can be expressed as:

$$\sin \theta_1 = S \cos \phi + \sin \phi \, (1 - S^2)^{1/2} \quad (3)$$

$$\theta_2 = \tan^{-1} ((v - h_f)/f_2) \quad (4)$$

On the other hand, in the case of the "LCL" arrangement as shown in FIG. 4, since the light angle $\theta_1$ incoming from the point A is equal to the light angle $\theta_2$ incoming from the point A', the following expressions can be obtained:

$$\sin \theta_1 = ((v - PJ)/(f_1^2 + (v - PJ)^2)^{1/2} \quad (5)$$

$$\sin \theta_2 = (\sin (\tan^{-1} ((v - h_f)/f_2) - \phi)) \cos \phi + \quad (6)$$
$$(\sin \phi) (n_c^2 - (\sin (\tan^{-1} ((v - h_f)/f_2) - \phi))^2)^{1/2}$$

The above-mentioned calculations are executed on the horizontal axis passing through the center of the circular Fresnel lens 6 in both the cases of the "CLL" and "LCL" arrangements. However, the vertical coordinate value at the image formation point B is not constant with respect to the horizontal coordinate value, but deviates along a circular arc shape. Therefore, in the optical system in which the light is projected from above as shown in FIGS. 2 and 4, it is preferable to determine the vertical coordinate value $h_f$ of the point $B_f$ as $h_f \leq 0$.

The linear Fresnel lens sheet 6 used in the present invention is formed of a light transmissible base material. The base material is any one of ester acrylate (such as polymethyl methacrylate, polymethyl acrylate) and ester methyl methacrylate or copolymer of the two, polyester (such as polyethylene telephtalate, or polybutylene telephtalate), thermoplastic resin (such as polycarbonate, polystyrene, poly methyl pentene) or acrylate (multifunction urethane acrylate, polyester acrylate cross-linked by ultra-violet rays or electron rays), a transparent resin (such as unsaturated polyester), a transparent glass, a transparent ceramic, etc.

The light transmission characteristics required for the base material are such that the minimum projection light must be transmitted therethrough to such an extent as not to raise a problem in the respective uses. The most preferable base material may be a colorless, transparent substance. However, when used as the lens sheet, a colored, transparent or a matt (or frosted), semi-transparent substance can be used according to the uses.

Further, since the transparent base material is used as the projection screen, a certain thickness and a rigidity sufficient to maintain the original shape against external forces are required. The ratio of screen thickness to the screen height is usually determined from about 0.003 to 0.01. In the "CLL" arrangement of present invention, however, since the linear Fresnel lens sheet (LFS) is sandwiched between the circular Fresnel lens sheet (CFS) and the lenticular lens sheet (LLS), as far as these two outer sheets have a thickness and a rigidity enough to maintain the original shape, respectively, it is possible to use the linear Fresnel lens sheet (LFS) of less thickness and less rigidity, that is, to use a film of about 50 to 300 μm. In this case, when the lenticular lens sheet is curved and further the linear Fresnel lens sheet (LFS) is sandwiched between the circular Fresnel lens sheet and the curved lenticular lens sheet, it is possible to eliminate a specific film holing mechanism. In the prior art "LCL" arrangement, when the linear Fresnel lens sheet (LFS) is thin and weak, a specific mechanism for holding the weak lens sheet has been so far required.

To form the prism-shaped unit lens group on a film surface in parallel to each other, various known methods can be adopted. For instance, Japanese Published Unexamined (Kokai) Patent Application No. 56-157310 discloses a thermal press method; Japanese Published Unexamined (Kokai) Patent Application No. 61-156273 discloses a method such that a thermoplastic film of ultraviolet ray (UV) hardened type is first embossed by a embossing roller and then hardened by ultraviolet rays; and Japanese Published Unexamined (Kokai) Patent Application No. 3-223883 and U.S. Pat. No. 4,576,850 disclose a method such that a resin liquid of ultraviolet ray or electron beam hardened type is applied onto an embossed roller (on which the lens shapes are engraved) to fill the recessed portions thereof; the embossed roller is covered with a transparent film; the resin is hardened by irradiating the ultraviolet rays or electron beams to the resin through the transparent film; the film adhered onto the resin is removed from the embossed roller embossed together with the embossed resin.

In the method of using an embossed roller, since the formed lenses are further rolled up for the succeeding process, it is preferable to use a relatively soft or flexible base material as the resin of the ultraviolet ray or electron beam hardened type, from the viewpoint of preventing the sheet from being cracked.

In the "CLL" arrangement according to the present invention, since the linear Fresnel lens sheet of less rigidity can be used, it is possible to effectively adopt the above-mentioned method of forming prism-shaped lens group on a film taken up around a roller with the use of the UV hardened resin.

Further, the size of the prism-shaped unit lens of the linear Fresnel lens sheet 6 is from 0.05 to 0.2 mm in height at the maximum lens angle portion and from 0.1 to 0.5 mm in lens pitch, which is determined so that moire will not be produced between the linear and circular Fresnel lens sheets.

As the lenticular lens sheet 5 used in the present invention, a linear lens-line sheet such that a number of columnar unit lenses are arranged in parallel to each other in the longitudinal direction of the unit lenses can be used (as a lenticular lens in a broader sense). Alternatively, fly-eye lens sheet such that a number of semispherical projecting unit lenses are arranged in two dimensional way can be used (as a lens in a broader sense).

Here, the cross-sectional shape of the unit lens is a part of continuous and smooth curves (such as circle, oval, cardioid, Rankine's egg, cycloid, involute, a curve of quartic degree, etc.) or a part of the polygonal shape (such as triangle, square, hexagon, polygon etc.).

The unit lens is of convex or concave lens. Among these, a circular cylinder or an oval cylinder is preferable from the standpoints of design and manufacturing easiness and the light diffusion characteristics (at the half angle value, less side lobe light, brightness isotropy at half angle, brightness in the normal direction, etc.). In particular, an oval unit lens whose major axis is set to the normal direction of the surface light source is most preferable because the brightness and the diverging angle are well balanced.

These unit lenses can be formed of a single sheet. However, when columnar lenses are used so as to control the diffusion angles of the light in two (upper and lower or right and left) directions, it is also possible to compose two lens sheets in such a way as to cross the longitudinal directions of the unit lenses at right angles. In this case, the light transmissibility is the highest when the lens surfaces of the two sheets are directed in the same direction. Further, it is also possible to overlap the two sheets in such a way that the respective lens surfaces are opposed to each other (in this case, the lens surfaces are sandwiched between the two sheets).

In these lenticular lens sheet, a light absorbing layer is usually formed on the viewer's side surface thereof in parallel to the longitudinal direction of the unit lenses and at the light non-converged portions of the incident light side lenses, in order to improve the contrast of the picture.

The lenticular lens sheet 5 is also formed of a light transmissible base material, which is the same as that of the linear Fresnel lens sheet 6. Usually, however, the lenticular lens sheet 5 is made of acrylic or polycarbonate resin. Further, for light diffusion, the light transmissible base material is mixed with particles having diameters of about several tens μm (beads) and a refractive index different from that of the resin.

When the light transmissible base material is used for the lenticular lens sheet 5 of the projection screen, since a certain thickness or a rigidity is required to some extent during the manufacturing process and in service, the usual thickness thereof is about 0.5 to 1.5 mm.

The method of forming the lenticular lens sheet 5 is the same as that of the linear Fresnel lens sheet. The size of the linear unit lens of the lenticular lens sheet is such that the pitch is about from 0.5 to 1.0 mm. In the case of a large screen, however, the unit lenses are arranged at a pitch of more than 1.0 mm.

The circular lens sheet 7 is also formed of a light transmissible base material, which is the same as that of the linear Fresnel lens sheet 6. Usually, however, the circular lens sheet 5 is made of acrylic or polycarbonate resin. Further, when the light transmissible base material is used as the circular Fresnel lens sheet 7 of the projection screen, since a certain thickness or a rigidity is required to some extent during the manufacturing process and in service, the usual thickness ratio to the screen height is about 0.01 to 0.1.

The method of forming the circular Fresnel lens sheet 7 is the same as that of the linear Fresnel lens sheet. In particular, the press method, the UV hardened molding method, the casting method are suitable to produce a plurality of the sheets.

Further, the size of the linear unit lens is from 0.05 to 1.5 mm in height at the maximum lens angle portion, and from 0.06 to 1.0 mm in lens pitch, which is determined so that moire will not be produced between the lenticular lens and circular Fresnel lens sheets and between the linear and circular Fresnel lens sheets.

Preferred examples of the present invention will be described hereinbelow in comparison with some comparative examples.

EXAMPLE 1

A "CLL" arrangement projection screen according to the present invention was manufactured under the following conditions:

| | |
|---|---|
| * Projection screen: | size: 40 inches |
| | aspect ratio: 3:4 |
| * Circular Fresnel focal distance: | 12000 mm (in design) |
| * Projection distance | 706 mm (the same as $f_1$) |
| * Converging distance | 1920 mm (actual value in vertical direction, the same as $f_2$) |

| | |
|---|---|
| * Center shift | 210 mm |
| * CRT height | 320 mm |
| * CRT convergent angle | 9.5 degrees |
| * Linear Fresnel refractive index | 1.49 |
| * Circular Fresnel refractive index | 1.49 |
| * Converging height in vertical direction | 0 mm |

EXAMPLE 2

A projection screen was manufactured in the same way as in Example 1, except the refractive index of the circular Fresnel lens sheet.

| | |
|---|---|
| * Circular Fresnel refractive index | 1.55 |
| (UV mold, base plate: | 1.49) |

COMPARATIVE EXAMPLE 1

A projection screen was manufactured in the same way as in Example 1, except the "LCL" arrangement.

COMPARATIVE EXAMPLE 2

A projection screen was manufactured in the same way as in Example 2, except the "LCL" arrangement.

Table 1 lists the lens angles (in degree) of the linear Fresnel lens and the circular Fresnel lens in both the Example 1 (CLL type) and the Comparative Example 1 (LCL type). In the circular Fresnel lens, the lens angles are shown according to the radii (r) from the optical center of the concentric circles. In the linear Fresnel lens, the lens angles are shown according to the distance (V) from the upper end of the screen. Further, the negative lens angles of the linear Fresnel lens indicate that the lens surface is directed downward.

TABLE 1

| Lens Angle | | | | |
|---|---|---|---|---|
| Circular Lens | | | CLL Type | LCL Type |
| r (mm) | Angle (Deg.) | Lenticular Lens V (mm) | Angle (Deg.) | Angle (Deg.) |
| 0 | 0.00 | 0 | −1.11 | −1.29 |
| 50 | 8.71 | 50 | −3.26 | −3.35 |
| 100 | 17.08 | 100 | −5.45 | −5.52 |
| 150 | 24.86 | 150 | −7.67 | −7.68 |
| 200 | 31.88 | 200 | −9.90 | −9.73 |
| 250 | 38.10 | 250 | −12.12 | −11.56 |
| 300 | 43.53 | 300 | −14.29 | −13.10 |
| 350 | 48.23 | 350 | −16.40 | −14.30 |
| 400 | 52.31 | 400 | −18.44 | −15.13 |
| 450 | 55.83 | 450 | −20.39 | −15.59 |
| 500 | 58.87 | 500 | −22.23 | −15.69 |
| 550 | 61.51 | 550 | −23.98 | −15.46 |
| 600 | 63.80 | 600 | −25.62 | −14.94 |
| 650 | 65.81 | | | |
| 700 | 67.56 | | | |

In the above-mentioned Examples 1 and 2 and Comparative Examples 1 and 2 of the projection screen having no lenticular lens sheet, the horizontal outgoing light angles, the vertical outgoing light angles and the loss were measured for red, green and blue projection light rays. The measurement positions are 25 in total, where 5 positions (0.0, 101.6, 203.2, 304.8, and 406.4) are taken on the horizontal coordinate and 5 positions (304.8, 152.4, 0.0, −152.4, −304.8) are taken on the vertical coordinate with the center of the projection screen as the origin.

Tables 2 to 5 list these measurement results, in which Table 2 corresponds to Example 1; Table 3 corresponds to Example 2; Table 4 corresponds to Comparative Example 1; and Table 5 corresponds to Comparative Example 2, respectively. In each table, the measurement results are arranged in the horizontal direction in the order of horizontal coordinate value, red light, green light, and blue right from the left side (divided by two vertical lines). Further, for each light (between the double vertical lines), the measurement results are arranged in the order of horizontal outgoing light angle, vertical outgoing light angle, and loss (%) (divided by a vertical line).

TABLE 2

(Example 1)

TABLE TOP (CLL) TYPE
Size: 40  Aspect: NTSC/CL
Refractive Index L: 1.49  Refractive Index C: 1.49

| | Red | | | Green | | | Blue | | |
|---|---|---|---|---|---|---|---|---|---|
| Horizontal Axis | Outgoing Angle (Deg.) | | Loss (%) | Outgoing Angle (Deg.) | | Loss (%) | Outgoing Angle (Deg.) | | Loss (%) |
| | Hor. | Vert. | | Hor. | Vert. | | Hor. | Vert. | |
| Vertical Position = 304.8 | | | | | | | | | |
| 0.0 | 9.62 | −9.32 | 14.72 | 0.00 | −9.13 | 14.69 | −9.62 | −9.32 | 14.72 |
| 101.6 | 8.46 | −8.86 | 14.71 | −0.78 | −9.04 | 14.77 | −10.95 | −9.66 | 15.02 |
| 203.2 | 7.43 | −8.32 | 14.90 | −1.53 | −8.77 | 15.19 | −12.47 | −9.82 | 16.30 |
| 304.8 | 6.47 | −7.75 | 15.45 | −2.24 | −8.37 | 16.33 | −14.20 | −9.83 | 19.97 |
| 406.4 | 5.55 | −7.18 | 16.57 | −2.92 | −7.89 | 18.53 | −16.27 | −9.75 | 28.43 |
| Vertical Position = 152.4 | | | | | | | | | |
| 0.0 | 9.27 | −4.36 | 14.63 | 0.00 | −4.55 | 14.62 | −9.27 | −4.36 | 14.63 |
| 101.6 | 8.33 | −4.16 | 14.65 | −0.59 | −4.47 | 14.64 | −10.32 | −4.40 | 14.71 |
| 203.2 | 7.44 | −3.83 | 14.76 | −1.18 | −4.23 | 14.85 | −11.49 | −4.26 | 15.38 |
| 304.8 | 6.57 | −3.42 | 15.17 | −1.77 | −3.87 | 15.63 | −12.78 | −3.96 | 17.65 |

TABLE 2-continued (Example 1)

TABLE TOP (CLL) TYPE  
Size: 40  Aspect: NTSC/CL  
Refractive Index L: 1.49  Refractive Index C: 1.49

| Horizontal Axis | Red Outgoing Angle (Deg.) Hor. | Vert. | Loss (%) | Green Outgoing Angle (Deg.) Hor. | Vert. | Loss (%) | Blue Outgoing Angle (Deg.) Hor. | Vert. | Loss (%) |
|---|---|---|---|---|---|---|---|---|---|
| 406.4 | 5.71 | −2.97 | 16.09 | −2.36 | −3.44 | 17.34 | −14.25 | −3.53 | 23.01 |
| Vertical Position = 0 | | | | | | | | | |
| 0.0 | 8.67 | 0.49 | 14.79 | 0.00 | 0.00 | 14.74 | −8.67 | 0.49 | 14.79 |
| 101.6 | 7.89 | 0.53 | 14.82 | −0.46 | 0.08 | 14.82 | −9.49 | 0.63 | 14.98 |
| 203.2 | 7.14 | 0.71 | 15.03 | −0.94 | 0.29 | 15.15 | −10.40 | 0.99 | 15.77 |
| 304.8 | 6.37 | 1.00 | 15.54 | −1.44 | 0.62 | 16.01 | −11.41 | 1.39 | 17.87 |
| 406.4 | 5.58 | 1.36 | 16.53 | −1.96 | 1.02 | 17.67 | −12.54 | 1.96 | 22.25 |
| Vertical Position = −152.4 | | | | | | | | | |
| 0.0 | 7.95 | 5.27 | 15.78 | 0.00 | 4.55 | 15.64 | −7.95 | 5.27 | 15.78 |
| 101.6 | 7.29 | 5.21 | 15.77 | −0.40 | 4.62 | 15.80 | −8.64 | 5.49 | 16.23 |
| 203.2 | 6.64 | 5.29 | 16.09 | −0.81 | 4.82 | 16.36 | −9.38 | 5.88 | 17.40 |
| 304.8 | 5.96 | 5.50 | 16.79 | −1.25 | 5.11 | 17.45 | −10.21 | 6.40 | 19.78 |
| 406.4 | 5.25 | 5.78 | 17.94 | −1.73 | 5.48 | 19.26 | −11.13 | 7.02 | 23.98 |
| Vertical Position = −304.8 | | | | | | | | | |
| 0.0 | 7.25 | 10.03 | 18.98 | 0.00 | 9.13 | 18.03 | −7.25 | 10.03 | 18.38 |
| 101.6 | 6.66 | 9.91 | 18.22 | −0.37 | 9.19 | 18.26 | −7.86 | 10.30 | 19.13 |
| 203.2 | 6.07 | 9.93 | 18.56 | −0.76 | 9.36 | 18.99 | −8.51 | 10.71 | 20.69 |
| 304.8 | 5.46 | 10.06 | 19.35 | −1.18 | 9.63 | 20.28 | −9.23 | 11.25 | 23.38 |
| 406.4 | 4.82 | 10.28 | 20.60 | −1.62 | 9.96 | 22.22 | −10.03 | 11.89 | 27.60 |

TABLE 3

(Example 2)

TABLE TOP (CLL) TYPE  
Size: 40  Aspect: NTSC/CL  
Refractive Index L: 1.49  Refractive Index C: 1.55 (UV)

| Horizontal Axis | Red Outgoing Angle (Deg.) Hor. | Vert. | Loss (%) | Green Outgoing Angle (Deg.) Hor. | Vert. | Loss (%) | Blue Outgoing Angle (Deg.) Hor. | Vert. | Loss (%) |
|---|---|---|---|---|---|---|---|---|---|
| Vertical Position = 304.8 | | | | | | | | | |
| 0.0 | 9.62 | −9.32 | 15.43 | 0.00 | −9.13 | 15.40 | −9.62 | −9.32 | 15.43 |
| 101.6 | 8.47 | −8.90 | 15.42 | −0.73 | −9.04 | 15.46 | −10.83 | −9.59 | 15.66 |
| 203.2 | 7.36 | −8.39 | 15.56 | −1.44 | −8.77 | 15.75 | −12.07 | −9.67 | 16.54 |
| 304.8 | 6.29 | −7.84 | 15.97 | −2.11 | −8.37 | 16.54 | −13.30 | −9.57 | 18.83 |
| 406.4 | 5.24 | −7.29 | 16.83 | −2.73 | −7.89 | 18.05 | −14.46 | −9.30 | 23.94 |
| Vertical Position = 152.4 | | | | | | | | | |
| 0.0 | 9.27 | −4.36 | 15.35 | 0.00 | −4.75 | 15.34 | −9.27 | −4.36 | 15.35 |
| 101.6 | 8.27 | −4.14 | 15.37 | −0.61 | −4.47 | 15.36 | −10.29 | −4.43 | 15.42 |
| 203.2 | 7.28 | −3.80 | 15.46 | −1.22 | −4.23 | 15.51 | −11.31 | −4.32 | 15.90 |
| 304.8 | 6.28 | −3.37 | 15.78 | −1.82 | −3.87 | 16.07 | −12.31 | −4.06 | 17.42 |
| 406.4 | 5.28 | −2.92 | 16.50 | −2.40 | −3.44 | 17.29 | −13.25 | −3.68 | 20.68 |
| Vertical Position = 0 | | | | | | | | | |
| 0.0 | 8.67 | 0.48 | 15.48 | 0.00 | −0.00 | 15.44 | −8.67 | 0.48 | 15.48 |
| 101.6 | 7.80 | 0.57 | 15.51 | −0.53 | 0.07 | 15.50 | −9.52 | 0.54 | 15.62 |
| 203.2 | 6.92 | 0.79 | 15.68 | −1.06 | 0.28 | 15.74 | −10.37 | 0.76 | 16.18 |
| 304.8 | 6.01 | 1.11 | 16.09 | −1.61 | 0.60 | 16.37 | −11.20 | 1.10 | 17.61 |
| 406.4 | 5.08 | 1.49 | 16.88 | −2.17 | 0.99 | 17.58 | −12.01 | 1.52 | 20.41 |
| Vertical Position = −152.4 | | | | | | | | | |
| 0.0 | 7.95 | 5.25 | 16.25 | 0.00 | 4.55 | 16.13 | −7.95 | 5.25 | 16.25 |
| 101.6 | 7.19 | 5.26 | 16.26 | −0.49 | 4.62 | 16.26 | −8.70 | 5.37 | 16.57 |
| 203.2 | 6.39 | 5.40 | 16.53 | −0.98 | 4.80 | 16.67 | −9.44 | 5.63 | 17.39 |
| 304.8 | 5.57 | 5.63 | 17.09 | −1.50 | 5.08 | 17.49 | −10.17 | 5.99 | 19.02 |
| 406.4 | 4.71 | 5.93 | 18.03 | −2.04 | 5.42 | 18.84 | −10.88 | 6.42 | 21.76 |

TABLE 3-continued (Example 2)

TABLE TOP (CLL) TYPE  
Size: 40  Aspect: NTSC/CL  
Refractive Index L: 1.49  Refractive Index C: 1.55 (UV)

| Horizontal Axis | Red Outgoing Angle (Deg.) Hor. | Red Outgoing Angle (Deg.) Vert. | Loss (%) | Green Outgoing Angle (Deg.) Hor. | Green Outgoing Angle (Deg.) Vert. | Loss (%) | Blue Outgoing Angle (Deg.) Hor. | Blue Outgoing Angle (Deg.) Vert. | Loss (%) |
|---|---|---|---|---|---|---|---|---|---|
| Vertical Position = −304.8 | | | | | | | | | |
| 0.0 | 7.25 | 9.99 | 18.29 | 0.00 | 9.13 | 18.01 | −7.25 | 9.99 | 18.29 |
| 101.6 | 6.55 | 9.96 | 18.21 | −0.48 | 9.19 | 18.19 | −7.94 | 10.14 | 18.80 |
| 203.2 | 5.82 | 10.03 | 18.51 | −0.97 | 9.34 | 18.74 | −8.62 | 10.40 | 19.80 |
| 304.8 | 5.06 | 10.20 | 19.18 | −1.47 | 9.58 | 19.73 | −9.29 | 10.76 | 21.74 |
| 406.4 | 4.27 | 10.43 | 20.22 | −1.99 | 9.88 | 21.21 | −9.95 | 11.17 | 24.52 |

TABLE 4

(Comp. Example 1)

TABLE TOP (LCL) TYPE  
Size: 40  Aspect: NTSC/LC  
Refractive Index L: 1.49  Refractive Index C: 1.49

| Horizontal Axis | Red Outgoing Angle (Deg.) Hor. | Red Outgoing Angle (Deg.) Vert. | Loss (%) | Green Outgoing Angle (Deg.) Hor. | Green Outgoing Angle (Deg.) Vert. | Loss (%) | Blue Outgoing Angle (Deg.) Hor. | Blue Outgoing Angle (Deg.) Vert. | Loss (%) |
|---|---|---|---|---|---|---|---|---|---|
| Vertical Position = 304.8 | | | | | | | | | |
| 0.0 | 9.62 | −9.21 | 14.70 | 0.00 | −9.26 | 14.68 | −9.62 | −9.21 | 14.70 |
| 101.6 | 8.49 | −8.73 | 14.72 | −0.74 | −8.92 | 14.76 | −10.91 | −9.54 | 14.99 |
| 203.2 | 7.48 | −8.17 | 14.99 | −1.46 | −8.64 | 15.18 | −12.38 | −9.70 | 16.21 |
| 304.8 | 6.55 | −7.57 | 15.72 | −2.14 | −8.22 | 16.35 | −14.04 | −9.69 | 19.75 |
| 406.4 | 5.65 | −6.98 | 17.16 | −2.78 | −7.72 | 18.65 | −15.99 | −9.57 | 27.83 |
| Vertical Position = 152.4 | | | | | | | | | |
| 0.0 | 9.27 | −4.34 | 14.63 | 0.00 | −4.54 | 14.62 | −9.27 | −4.34 | 14.63 |
| 101.6 | 8.30 | −4.06 | 14.68 | −0.62 | −4.43 | 14.64 | −10.35 | −4.42 | 14.72 |
| 203.2 | 7.38 | −3.60 | 14.88 | −1.24 | −4.12 | 14.89 | −11.55 | −4.28 | 15.41 |
| 304.8 | 6.47 | −3.04 | 15.49 | −1.87 | −3.65 | 15.77 | −12.91 | −3.92 | 17.78 |
| 406.4 | 5.56 | −2.42 | 16.77 | −2.52 | −3.07 | 17.71 | −14.49 | −3.39 | 23.46 |
| Vertical Position = 0 | | | | | | | | | |
| 0.0 | 8.67 | 0.50 | 14.96 | 0.00 | 0.00 | 14.89 | −8.67 | 0.50 | 14.96 |
| 101.6 | 7.53 | 0.63 | 15.01 | −0.83 | 0.12 | 15.03 | −9.90 | 0.64 | 15.30 |
| 203.2 | 6.42 | 0.99 | 15.40 | −1.70 | 0.47 | 15.59 | −11.33 | 1.06 | 16.56 |
| 304.8 | 5.29 | 1.51 | 16.32 | −2.65 | 1.00 | 16.96 | −13.06 | 1.76 | 19.96 |
| 406.4 | 4.11 | 2.14 | 18.02 | −3.72 | 1.68 | 19.66 | −15.35 | 2.79 | 27.96 |
| Vertical Position = −152.4 | | | | | | | | | |
| 0.0 | 7.95 | 5.33 | 17.55 | 0.00 | 4.54 | 17.22 | −7.95 | 5.33 | 17.55 |
| 101.6 | 6.46 | 5.25 | 17.43 | −1.23 | 4.68 | 17.62 | −9.59 | 5.76 | 18.77 |
| 203.2 | 5.01 | 5.46 | 18.15 | −2.55 | 5.09 | 18.98 | −11.56 | 6.62 | 22.01 |
| 304.8 | 3.50 | 5.90 | 19.79 | −4.05 | 5.75 | 21.80 | −14.23 | 8.10 | 29.90 |
| 406.4 | 1.87 | 6.52 | 22.65 | −5.85 | 6.67 | 27.00 | −19.24 | 11.36 | 55.57 |
| Vertical Position = −304.8 | | | | | | | | | |
| 0.0 | 7.26 | 10.20 | 27.00 | 0.00 | 9.02 | 25.53 | −7.26 | 10.20 | 27.00 |
| 101.6 | 5.36 | 9.79 | 25.99 | −1.68 | 9.21 | 26.46 | −9.42 | 11.20 | 30.94 |
| 203.2 | 3.52 | 9.81 | 26.95 | −3.51 | 9.79 | 29.57 | −12.33 | 13.26 | 41.59 |
| 304.8 | 1.59 | 10.19 | 29.86 | −5.73 | 10.87 | 36.21 | | | 100.00 |
| 406.4 | −0.60 | 10.92 | 35.32 | −8.95 | 12.91 | 51.44 | | | 100.00 |

TABLE 5

(Comp. Example 2)

TABLE TOP (LCL) TYPE  
Size: 40     Aspect: NTSC/LC  
Refractive Index L: 1.49     Refractive Index C: 1.55 (UV)

| Horizontal Axis | Red Outgoing Angle (Deg.) Hor. | Vert. | Loss (%) | Green Outgoing Angle (Deg.) Hor. | Vert. | Loss (%) | Blue Outgoing Angle (Deg.) Hor. | Vert. | Loss (%) |
|---|---|---|---|---|---|---|---|---|---|
| Vertical Position = 304.8 | | | | | | | | | |
| 0.0 | 9.62 | −9.20 | 15.41 | 0.00 | −9.26 | 15.39 | −9.62 | −9.20 | 15.41 |
| 101.6 | 8.49 | −8.78 | 15.43 | −0.70 | −8.92 | 15.45 | −10.80 | −9.48 | 16.63 |
| 203.2 | 7.41 | −8.25 | 15.65 | −1.38 | −8.64 | 15.75 | −12.00 | −9.55 | 16.48 |
| 304.8 | 6.36 | −7.67 | 16.25 | −2.02 | −8.22 | 16.58 | −13.18 | −9.43 | 18.70 |
| 406.4 | 5.33 | −7.09 | 17.43 | −2.62 | −7.72 | 18.22 | −14.28 | −9.14 | 23.11 |
| Vertical Position = 152.4 | | | | | | | | | |
| 0.0 | 9.27 | −4.35 | 15.36 | 0.00 | −4.54 | 15.34 | −9.27 | −4.35 | 15.36 |
| 101.6 | 8.25 | −4.04 | 15.40 | −0.63 | −4.43 | 15.36 | −10.31 | −4.45 | 15.42 |
| 203.2 | 7.23 | −3.57 | 15.58 | −1.26 | −4.12 | 15.54 | −11.35 | −4.34 | 15.92 |
| 304.8 | 6.21 | −3.00 | 16.09 | −1.88 | −3.65 | 16.19 | −12.39 | −4.02 | 17.49 |
| 406.4 | 5.16 | −2.37 | 17.15 | −2.51 | −3.08 | 17.61 | −13.39 | −3.54 | 20.90 |
| Vertical Position = 0 | | | | | | | | | |
| 0.0 | 8.67 | 0.49 | 15.61 | 0.00 | −0.00 | 15.55 | −8.67 | 0.49 | 15.61 |
| 101.6 | 7.50 | 0.69 | 15.66 | −0.83 | 0.12 | 15.65 | −9.86 | 0.53 | 15.85 |
| 203.2 | 6.31 | 1.08 | 15.98 | −1.69 | 0.45 | 16.05 | −11.11 | 0.82 | 16.71 |
| 304.8 | 5.09 | 1.62 | 16.72 | −2.60 | 0.95 | 17.04 | −12.47 | 1.34 | 18.88 |
| 406.4 | 3.83 | 2.26 | 18.08 | −3.58 | 1.59 | 18.94 | −13.98 | 2.06 | 23.35 |
| Vertical Position = −152.4 | | | | | | | | | |
| 0.0 | 7.95 | 5.29 | 17.49 | 0.00 | 4.54 | 17.23 | −7.95 | 5.29 | 17.49 |
| 101.6 | 6.48 | 5.33 | 17.44 | −1.19 | 4.66 | 17.51 | −9.49 | 5.53 | 18.27 |
| 203.2 | 4.99 | 5.60 | 18.01 | −2.45 | 5.01 | 18.45 | −11.18 | 6.07 | 20.27 |
| 304.8 | 3.46 | 6.07 | 19.25 | −3.80 | 5.58 | 20.34 | −13.17 | 6.96 | 24.55 |
| 406.4 | 1.84 | 6.67 | 21.37 | −5.33 | 6.32 | 23.63 | −15.76 | 8.33 | 33.49 |
| Vertical Position = −304.8 | | | | | | | | | |
| 0.0 | 7.25 | 10.06 | 23.98 | 0.00 | 9.02 | 23.05 | −7.25 | 10.06 | 23.98 |
| 101.6 | 5.42 | 9.88 | 23.49 | −1.59 | 9.16 | 23.64 | −9.21 | 10.62 | 26.13 |
| 203.2 | 3.61 | 10.00 | 24.27 | −3.27 | 9.59 | 25.56 | −11.50 | 11.70 | 31.10 |
| 304.8 | 1.72 | 10.38 | 26.32 | −5.16 | 10.32 | 29.33 | −14.60 | 13.70 | 42.67 |
| 406.4 | −0.32 | 10.99 | 29.91 | −7.43 | 11.42 | 36.13 | | | 100.00 |

In Table 2 (Example 1), that is, in the case of CLL arrangement, the vertical outgoing light angles of the green light ray at the vertical position of—304.8 (the lowermost group) range from 9.13 to 9.96, and therefore the difference between these values is 0.83 degrees. In comparison with this, in Table 4 (Comparative example 1), that is, in the case of the LCL arrangement, the same angles range from 9.02 to 12.91, and therefore the difference between the two is 3.89 degrees, which is about 4 times larger than that of the CLL arrangement. This indicates that in the CLL arrangement of the present invention, the outgoing light angles are more uniform along the horizontal coordinate positions, than in the LCL arrangement of the prior art.

In the same way, in Table 3, (Example 2), that is, in the case of CLL arrangement, the vertical outgoing light angles of the green light ray at the vertical position of—304.8 (the lowermost group) range from 9.13 to 9.88, and therefore the difference between the two is 0.75 degrees. In comparison with this, in Table 5 (Comparative example 2), that is, in the case of the LCL arrangement, the same angles range from 9.02 to 11.42, and therefore the difference between the two is 2.40 degrees, which is about 3 times larger than that of the CLL arrangement.

Further, in Tables 2 and 3 (Examples 1 and 2), that is, in the case of CLL arrangement, the maximum differences in the horizontal outgoing light angles of the green light ray at the horizontal position of—406.4 (the right end group) are as small as 1.30 and 0.74, respectively. On the other hand, in Tables 4 and 5 (Comparative examples 1 and 2), that is, in the case of LCL arrangement, the maximum differences in the horizontal outgoing light angles of the green light ray at the horizontal position of—406.4 (the right end group) are as large as 6.17 and 4.81, respectively.

The light angles allowed to be incident upon the same lenticular lens element differ between the upper and lower portions of the screen, since the light diffusion characteristics differ between the upper and lower portions of the screen, this is not desirable because color non-uniformity is produced and a part of the incident light is absorbed by the light absorption layer.

Figure 6:
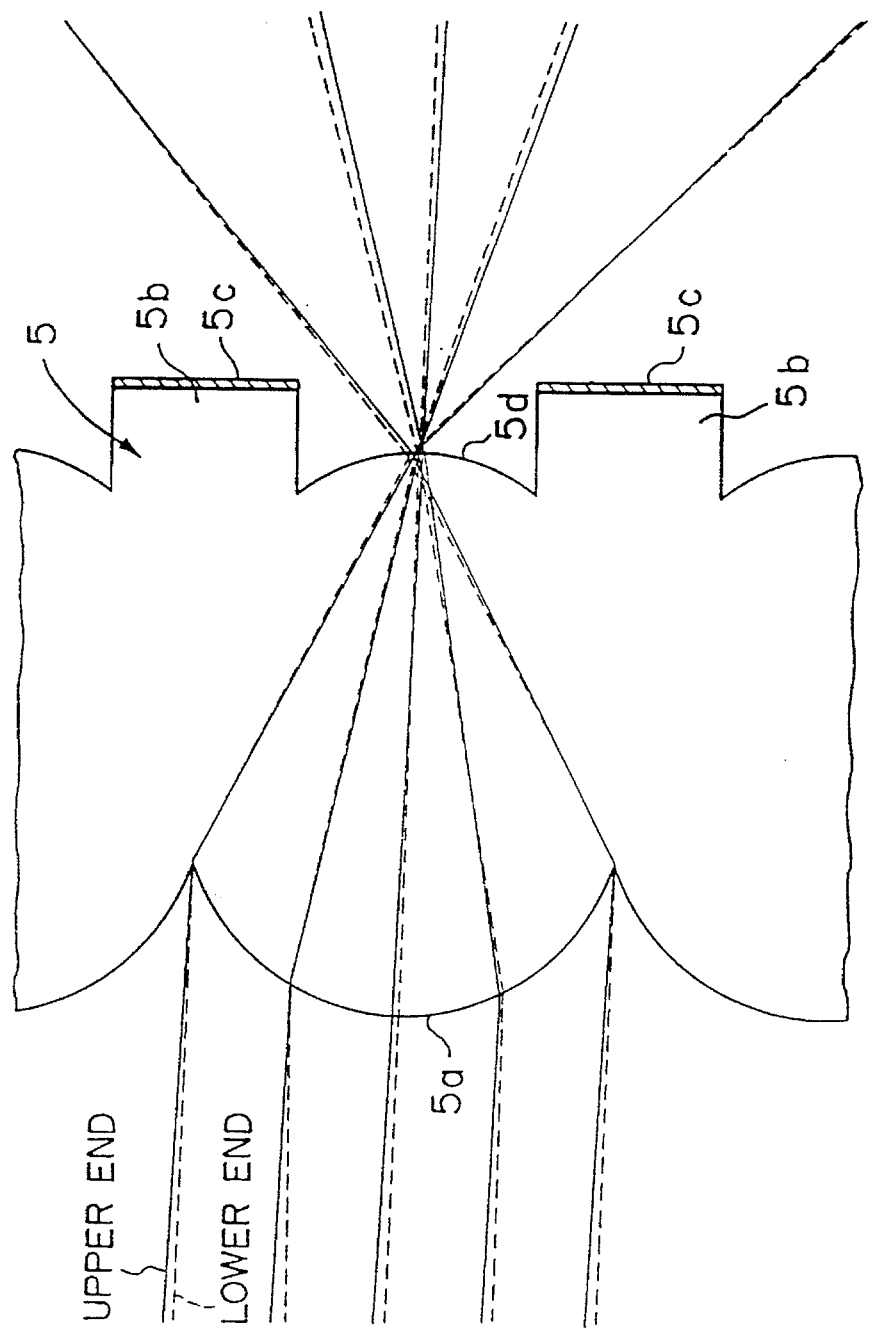
FIG. 6 is an illustration explanatory of the difference in incident angle to the lenticular lens between the upper and lower ends of an example of the screen according to the present invention.
Figure 7:
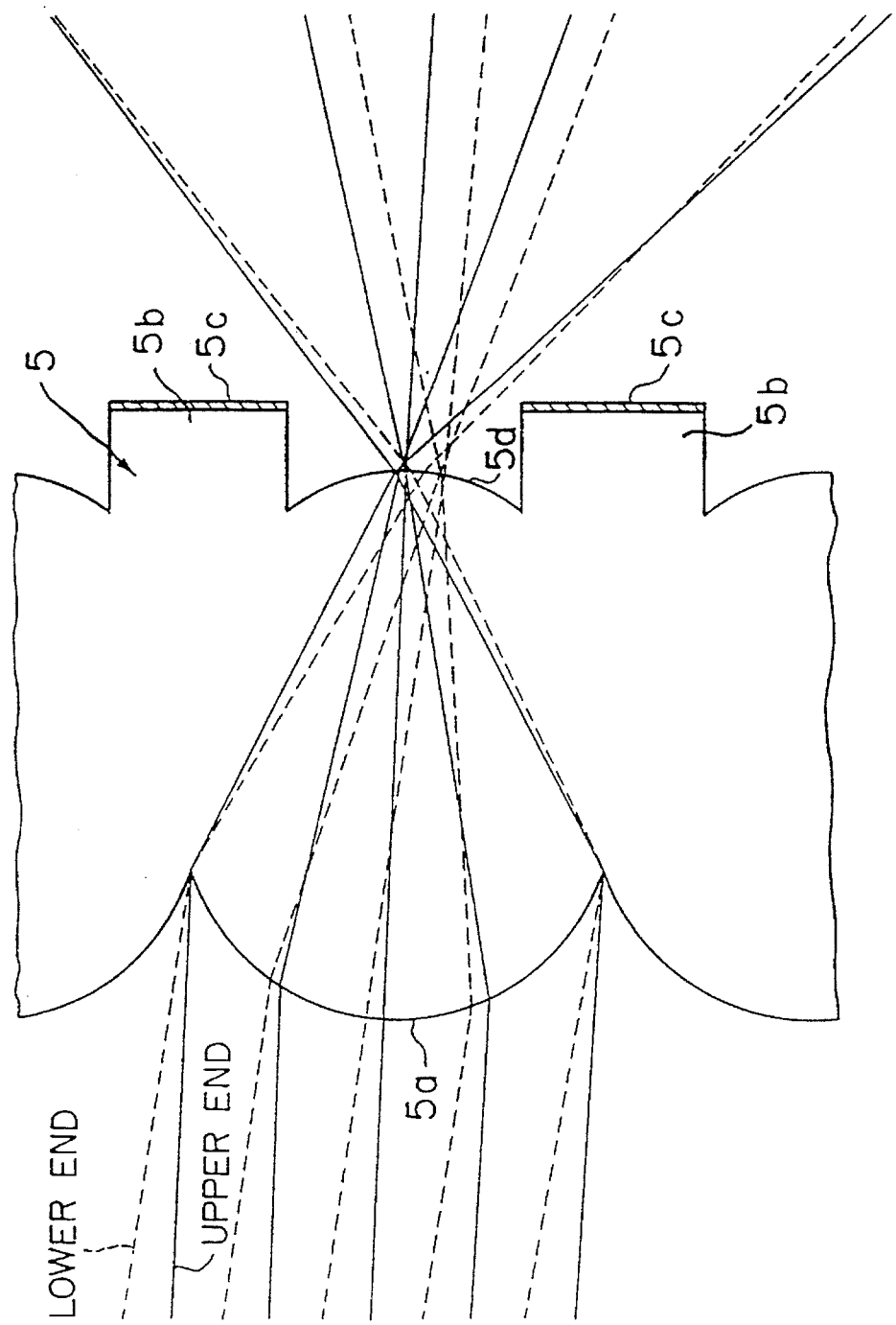
FIG. 7 is an illustration for assistance in explaining the difference in incident angle of the lenticular lens between the upper and lower ends of a comparative example of the screen.
Figure 8:
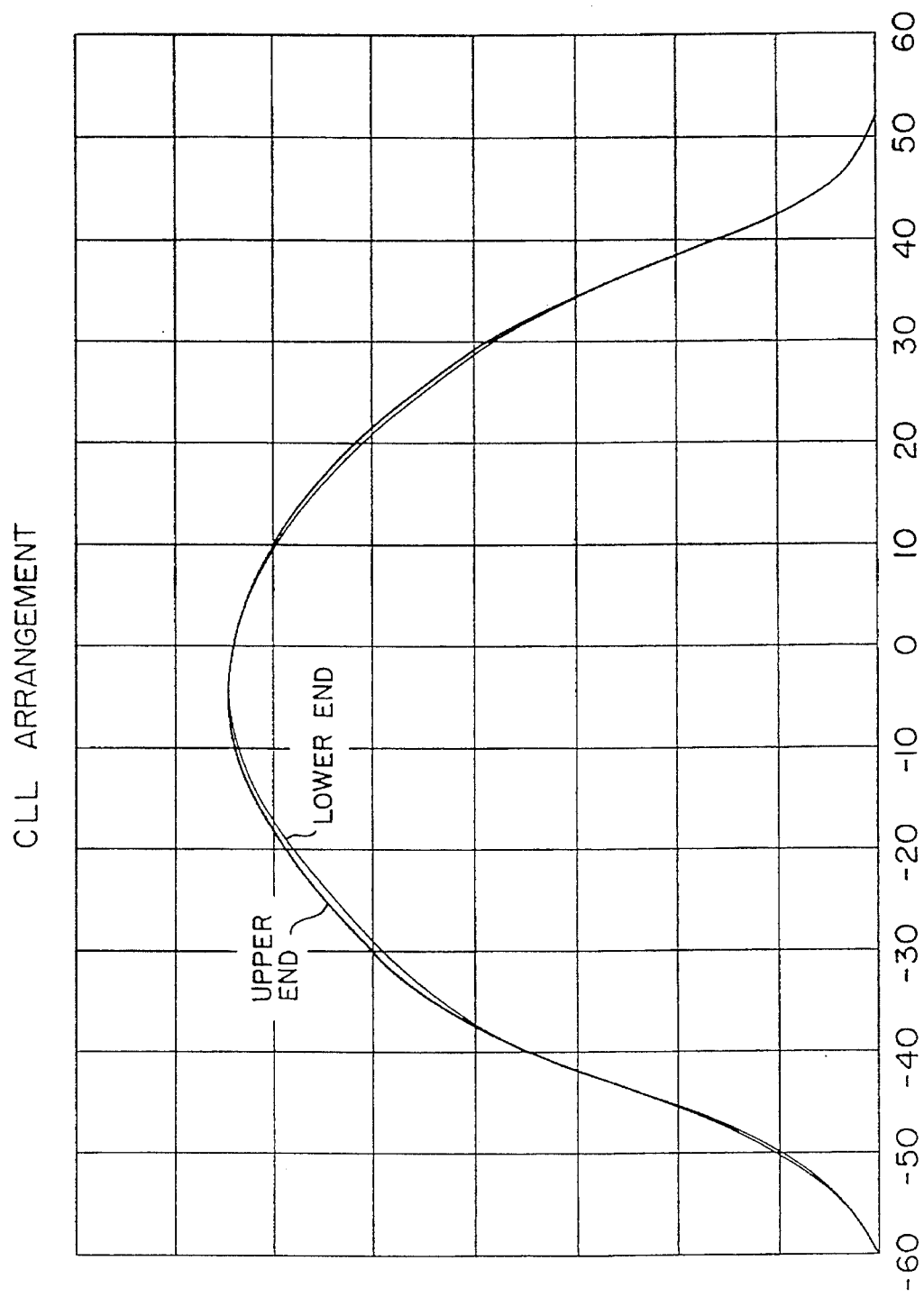
FIG. 8 is a graphical representation for assistance in explaining the difference in horizontal direction diffusion characteristics between the upper and lower ends of the example of the screen according to the present invention.
Figure 9:
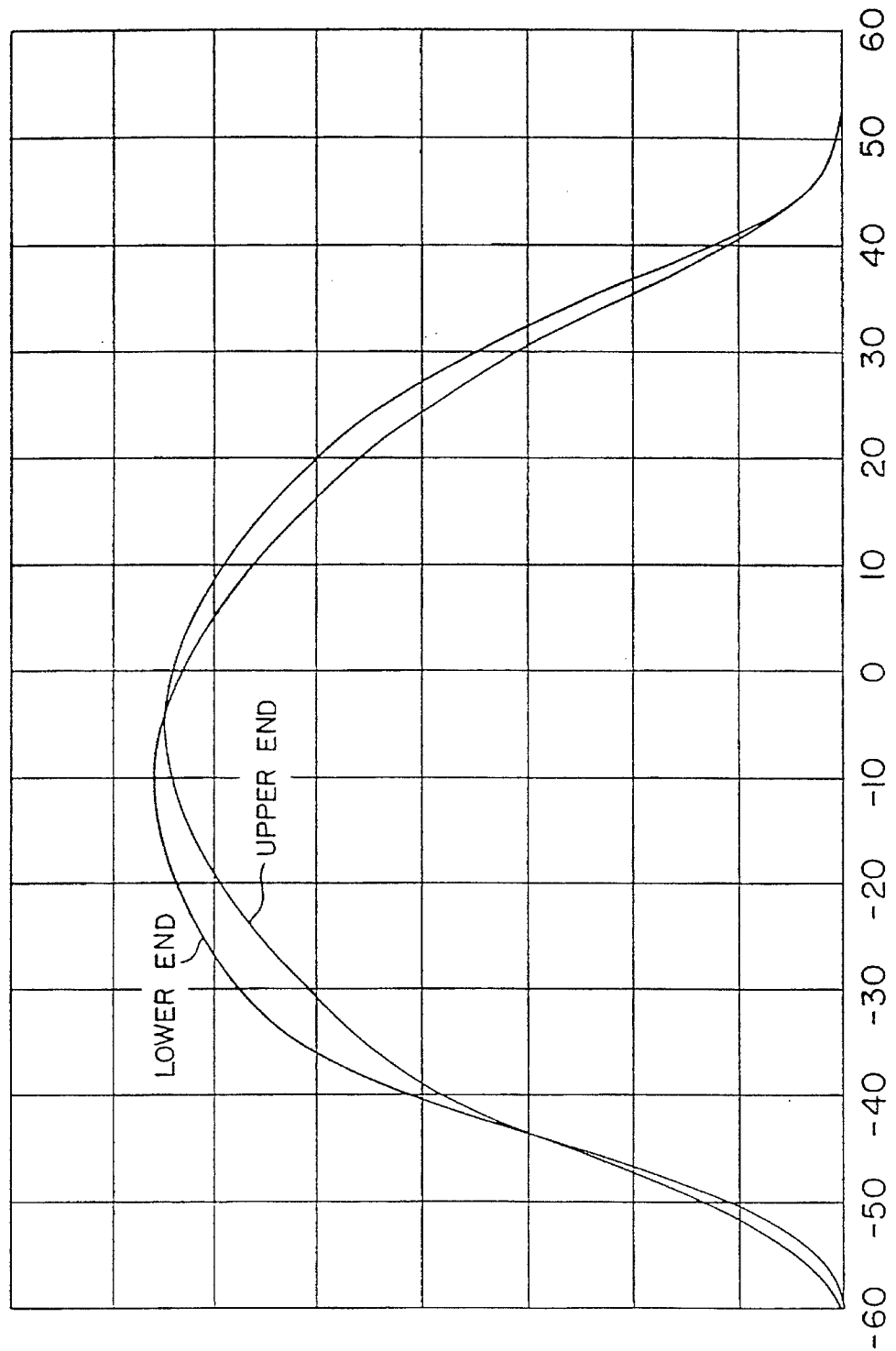
FIG. 9 is a graphical representation for assistance in explaining the difference in horizontal direction diffusion characteristics between the upper and lower ends of the comparative example of the screen.

FIG. 6 shows a difference in the light incident angle upon the lenticular lens 5 between the upper and lower ends of the right end portion of the screen in Example 1, and FIG. 7 shows a difference in the light incident angle upon the lenticular lens between the upper and lower ends of the screen in Comparative Example 1. Further, FIG. 8 shows a difference in diffusion characteristics in the horizontal direction between the upper and lower ends of the screen in Example 1, and FIG. 9 shows a difference in diffusion characteristics in the horizontal direction between the upper and lower ends of the screen in Comparative Example 1. These figures indicate that the CLL arrangement is superior to the LCL arrangement with respect to the uniformity of the outgoing light angle on the screen surface.

Figure 10:
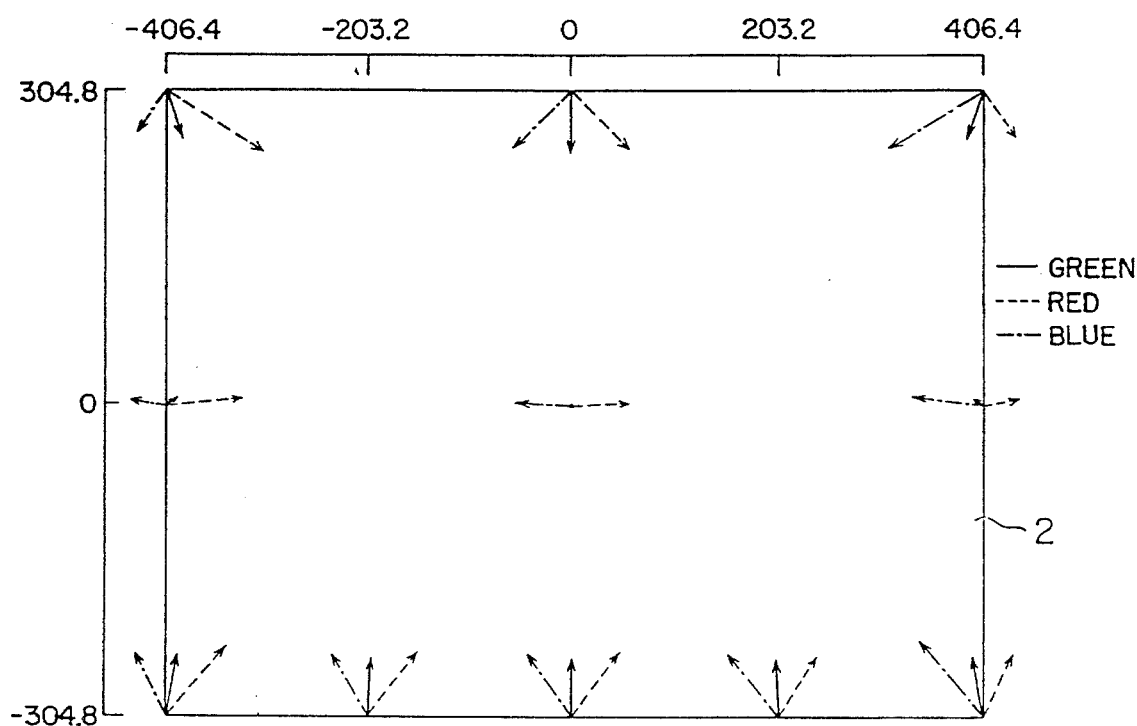
FIG. 10 is an illustration indicating outgoing light angles at various part of the projection screen, corresponding to Table 2.
Figure 11:
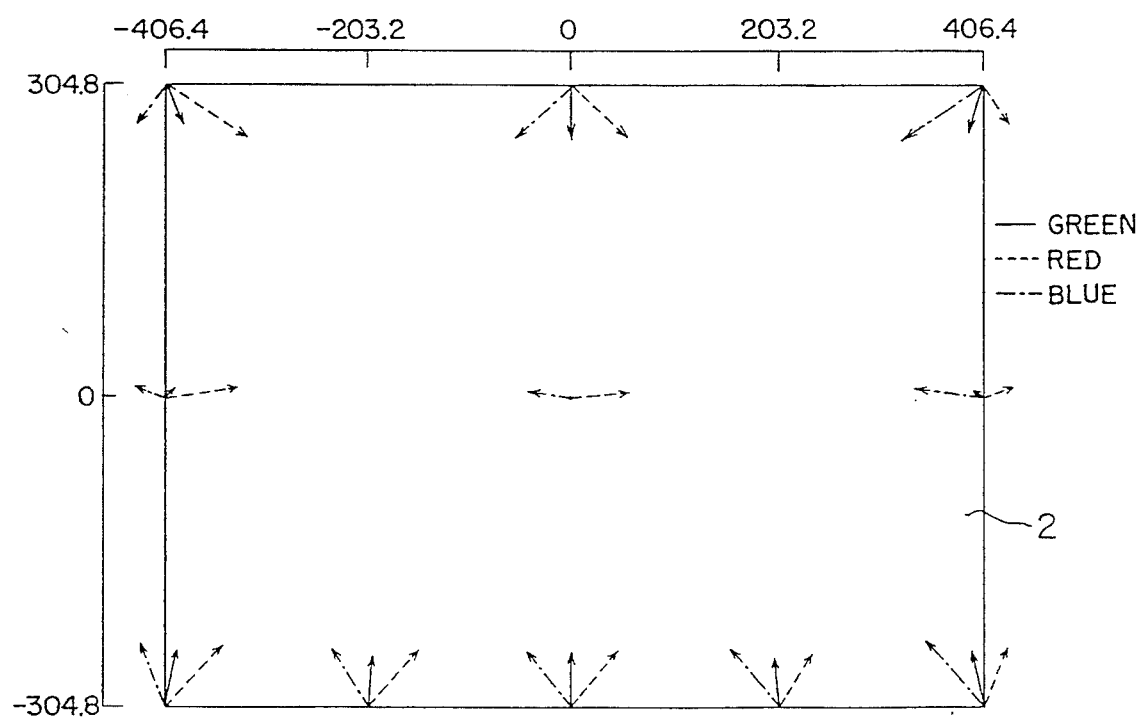
FIG. 11 is an illustration similar to FIG. 10 but corresponding to Table 3.
Figure 12:
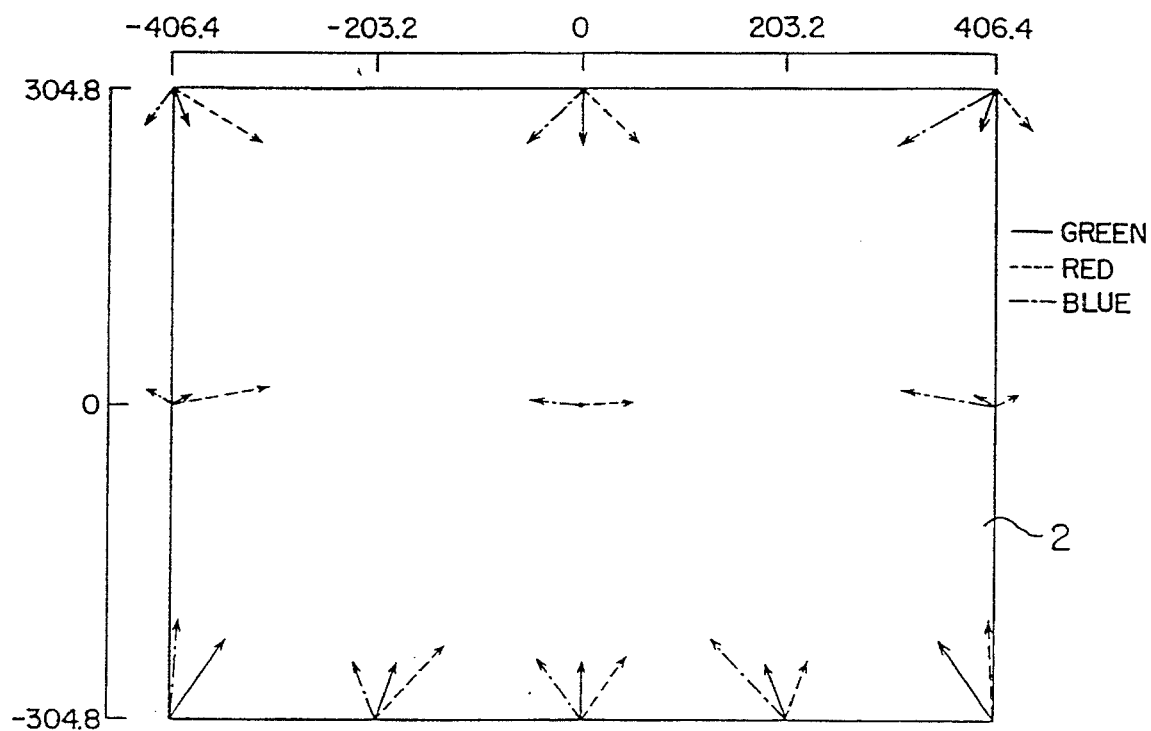
FIG. 12 is an illustration similar to FIG. 10 but corresponding to Table 4.

On the basis of the results of the measurement shown in Tables 2 to 5, the outgoing angles of light that has passed through the screen have been plotted in FIGS. 10 to 13, respectively. FIG. 10 is based on Table 2; FIG. 11 on Table 3; FIG. 12 on Table 4; and FIG. 13 on Table 5. In these figures, the outgoing light angle is expressed as tangent T/N shown in FIG. 14 where N is a normal line to the projection screen 2.

Figure 13:
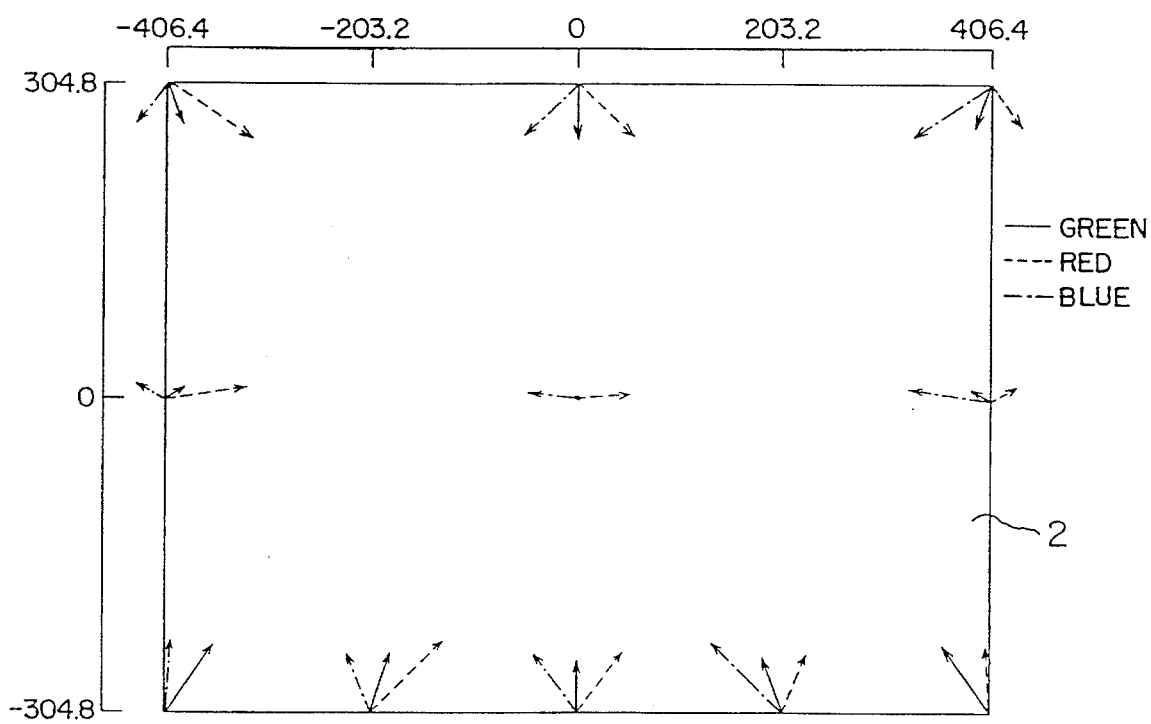
FIG. 13 is an illustration similar to FIG. 10 but corresponding to Table 5.

Comparisons between FIGS. 10 and 12 and between FIGS. 11 and 13 show that there are not much differences along the upper end or edge of the screen 2 but there are significant differences along the lower end or edge of the screen 2. That is, in the case of the LCL arrangement of FIGS. 12 and 13 (Tables 4 and 5), the outgoing light from the lower edge of the screen is directed more inward, whereas in the case of the CLL arrangement of FIGS. 10 and 11 (Tables 2 and 3), the outgoing light from the lower edge of the screen is directed less inward so that the outgoing light angle is substantially uniform throughout the lower edge region of the screen.

Figure 17:
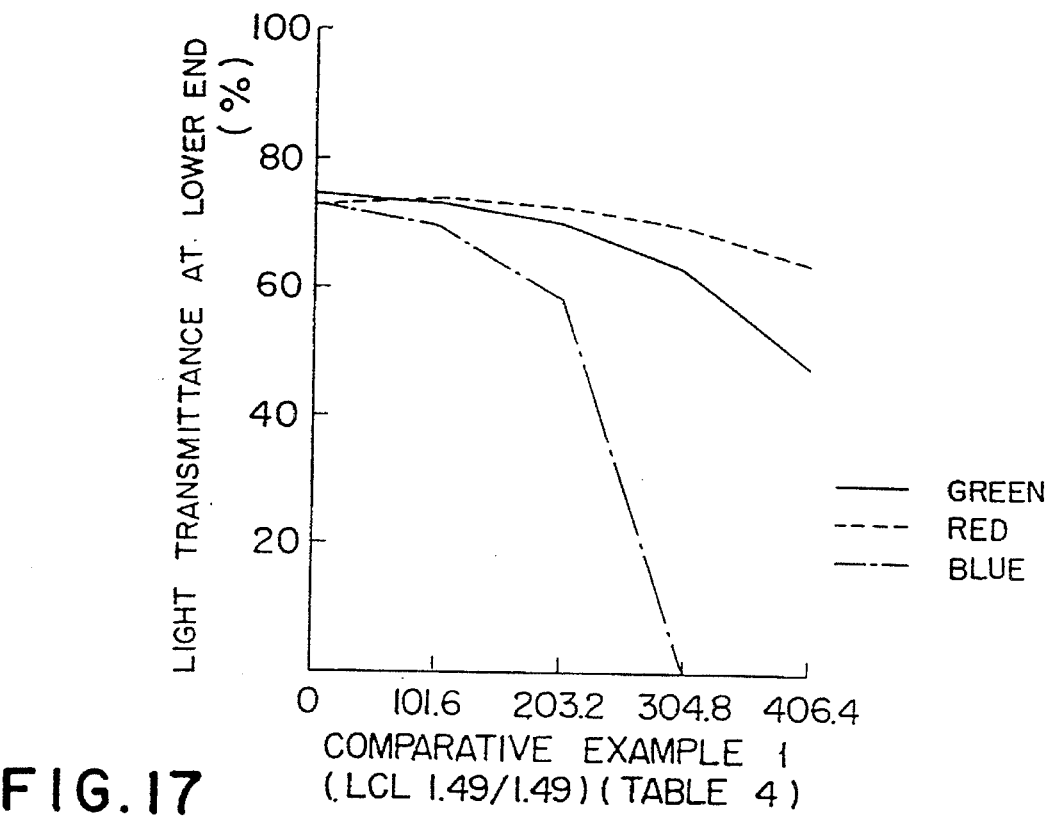
FIG. 17 is a graphical representation similar to FIG. 15 but corresponding to Comparative Example 1.
Figure 18:
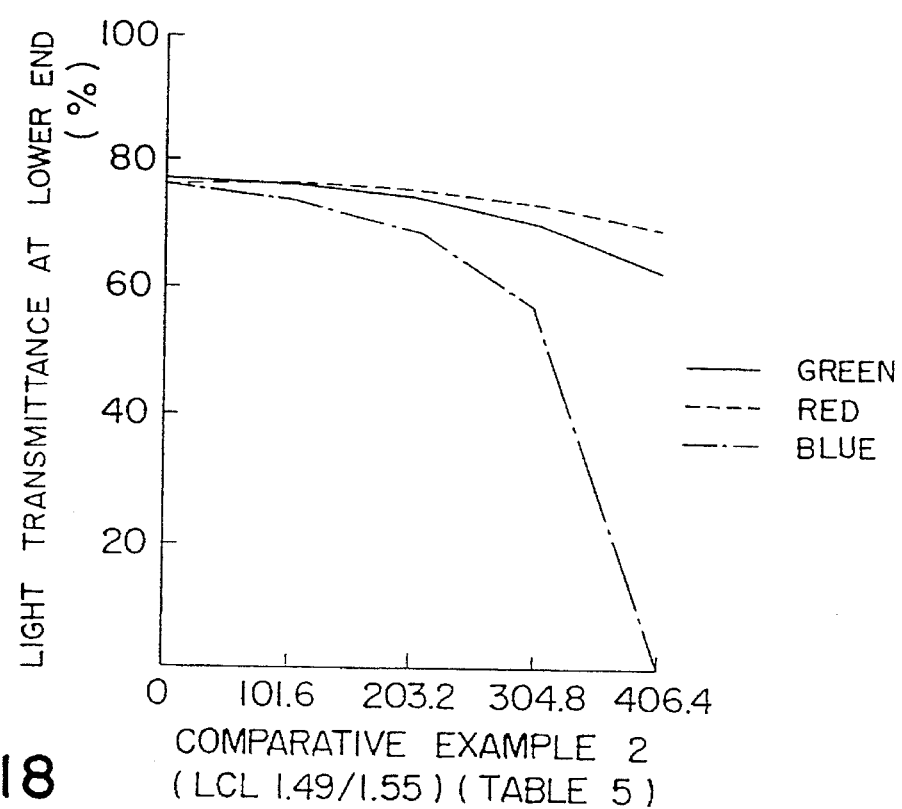
FIG. 18 is a graphical representation similar to FIG. 15 but corresponding to Comparative Example 2.

Light transmittance (%) along the lower edge of the screen is indicated in FIGS. 15 to 18. FIG. 15 corresponds to Example 1; FIG. 16 to Example 2; FIG. 17 to Comparative Example 1; and FIG. 18 to Comparative Example 2. In these figures, the more the curves of green, red and blue lights extend adjacent to each other, the more uniform is the color and the higher is the value of the light transmittance. Note that the light transmitance is defined as a value obtained by subtracting light loss (%) from 100.

Further, in the above-mentioned Examples 1 and 2 and Comparative Examples 1 and 2, the projection sheet having the lenticular lens sheet were manufactured, and pictures projected onto these screens were observed by visual inspection. In the case of Examples 1 and 2, the projected pictures were excellent without raising any problems. In Comparative Examples 1 and 2, however, although the projected picture was excellent at the central portion thereof respectively, the brightness was lowered and varied at the periphery thereof without forming a good color balance thereat, respectively, with the result that colors could not be correctly reproduced. Further, it has been confirmed that above-mentioned visual inspection results perfectly correspond to the afore-mentioned measurement results.

Figure 19:
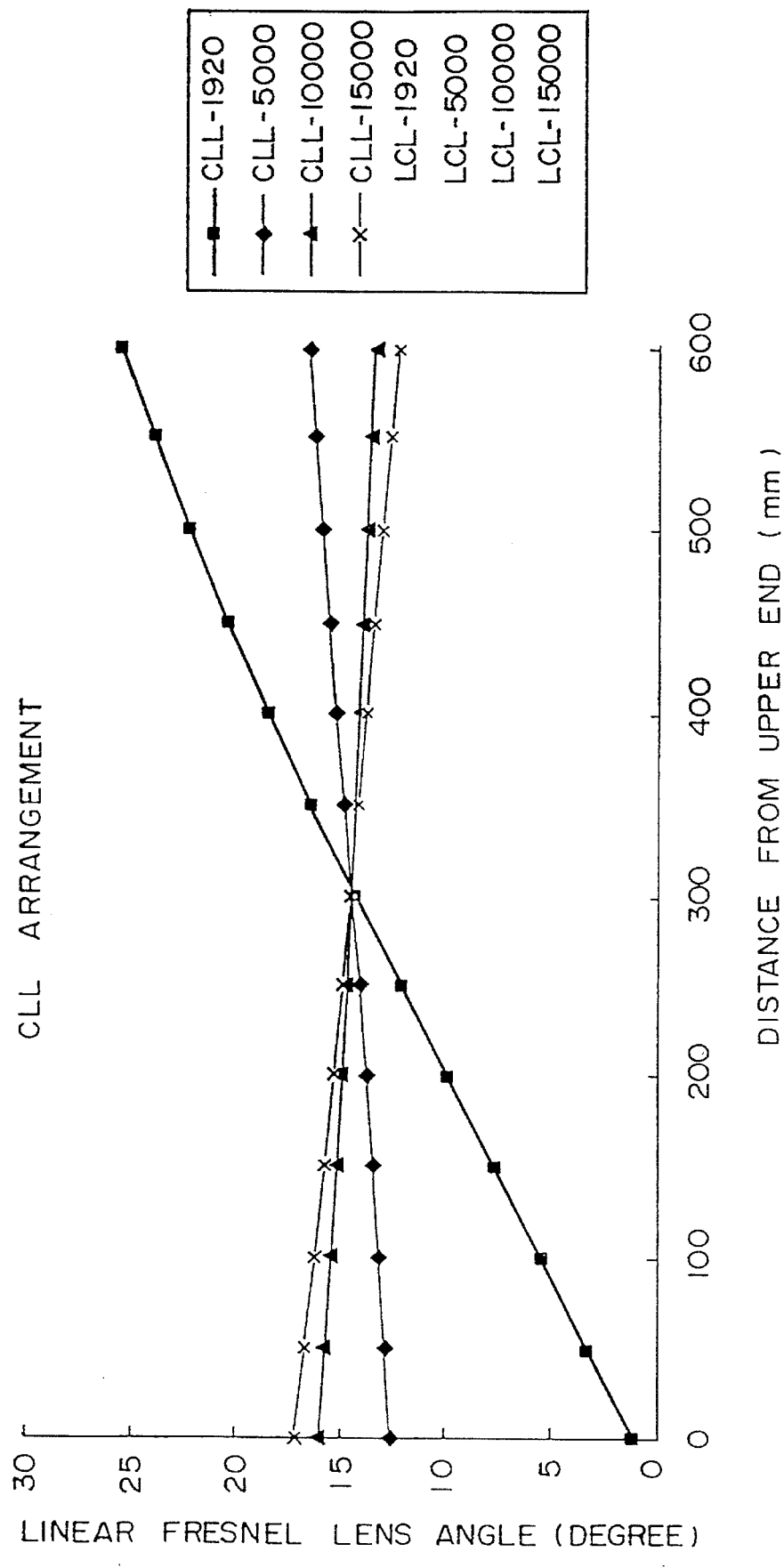
FIG. 19 is a graphical representation of the linear Fresnel lens angle against a vertical light convergent distance, for a CLL arrangement.
Figure 20:
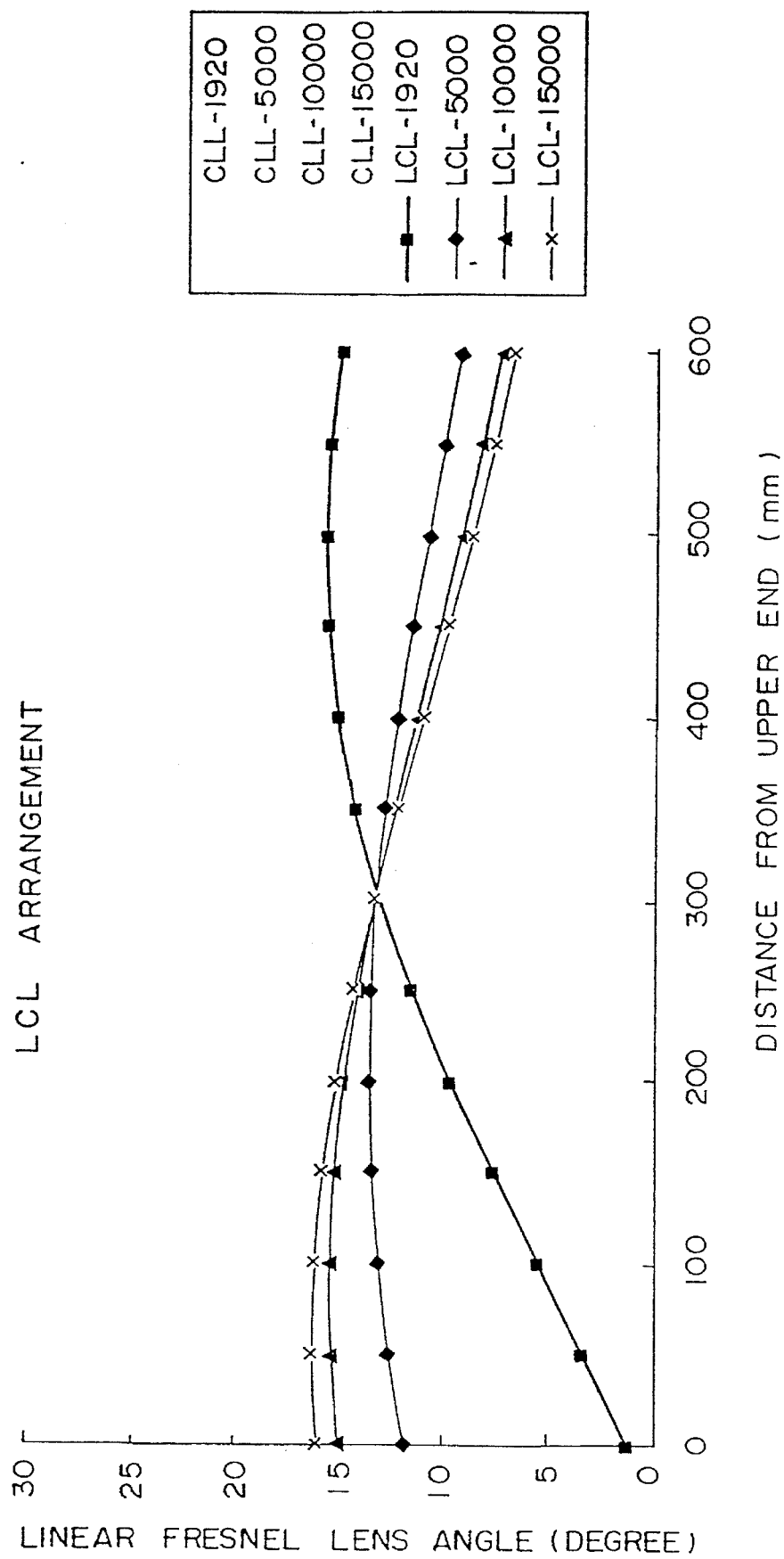
FIG. 20 is a graphical representation similar to FIG. 19 but for a LCL arrangement.

FIGS. 19 and 20 show the lens angles of the linear Fresnel lens obtained when only the vertical converging distance $f_2$ were varied in both the cases of Example 1 (CLL type) and Comparative Example 1 (LCL type), respectively. In the LCL arrangement of FIG. 20 (Comparative Example 1), there exists the maximum lens angle (an extreme value) at the respective vertical converging distance. In contrast with this, in the CLL arrangement of FIG. 19 (Example 1), there exist no maximum lens angle (an extreme value) at the respective vertical converging distance, and the lens angles increase or decrease monotonously. The above-mentioned results indicate that in the case of the CLL arrangement of FIG. 19, even if the Gutting precision of the molding die is deteriorated due to the back-lash of the lathe for instance, it is possible to eliminate the problems such that the projected picture is degraded by horizontal lines.

Figure 21:
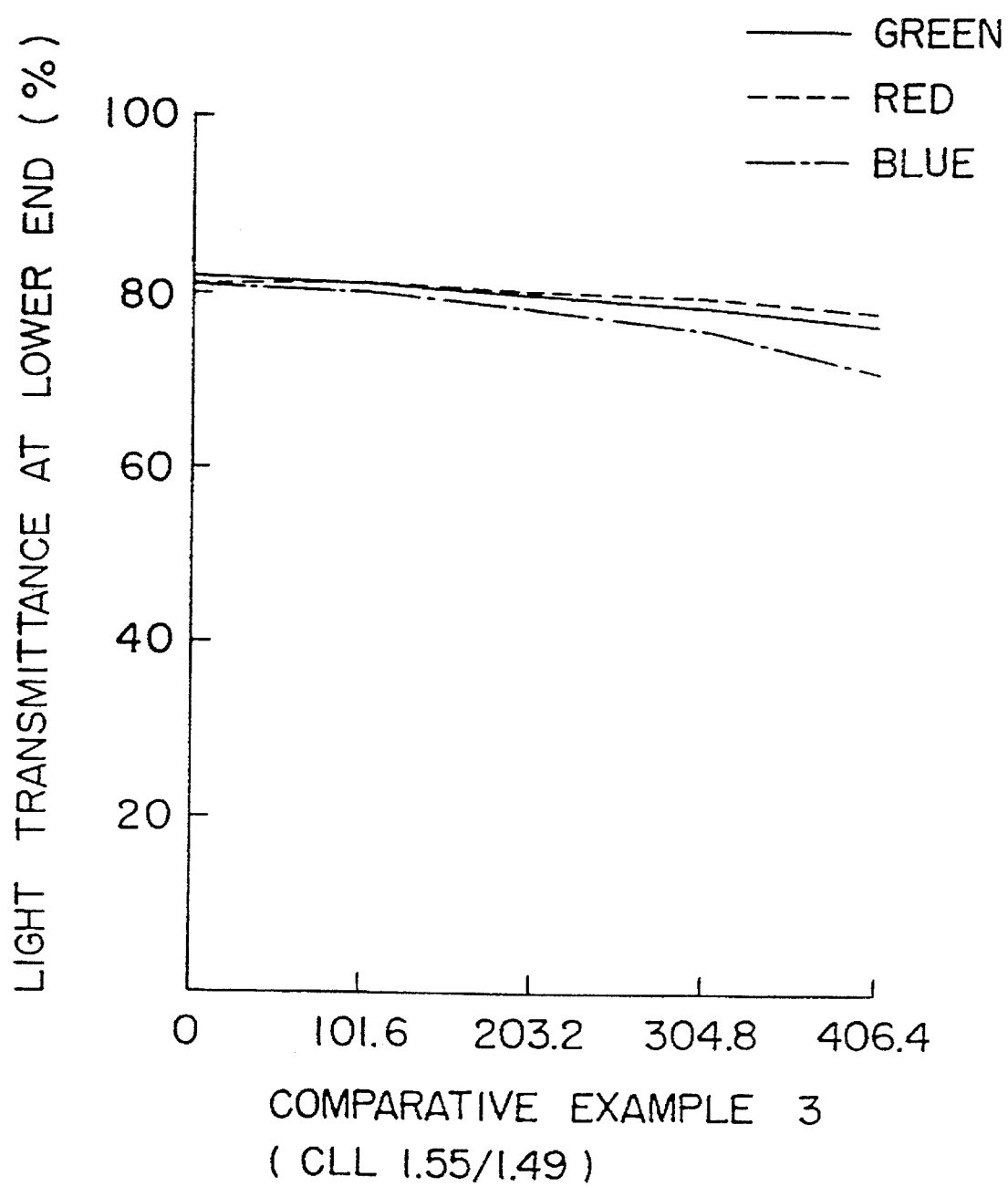
FIG. 21 is a graph similar to FIG. 15 but showing a case wherein the refractive indices of the circular and linear Fresnel lens sheets are made different.

FIG. 21 show the light transmittance (%) of green, red and blue lights along the lower edge of the projection screen in the case wherein the refractive index of the circular Fresnel lens sheet is set to 1.49 and that of the linear Fresnel lens sheet is set to 1.55. A comparison of FIG. 16 and FIG. 21 shows that light loss is reduced by making the refractive index of the circular Fresnel lens sheet greater than that of the linear Fresnel lens sheet.

FIGS. 22 to 26 show various modifications of the linear Fresnel lens sheets 6. In general, in the projection screen, part of the projected light is reflected by the internal lens surface and passed within the sheet as stray light. The stray light deteriorates the picture quality as double images or a rainbow image.

In the case of the optical system using the linear Fresnel lens as described above, in particular, when the stray light causes a white band extending in the horizontal direction, which can be observed more clearly than the rainbow image which tends to be produced in the circular Fresnel lens, thus resulting in a problem from the standpoint of picture quality.

The following modifications are effective to solve the above-mentioned problems caused by the stray light.

Figure 22:
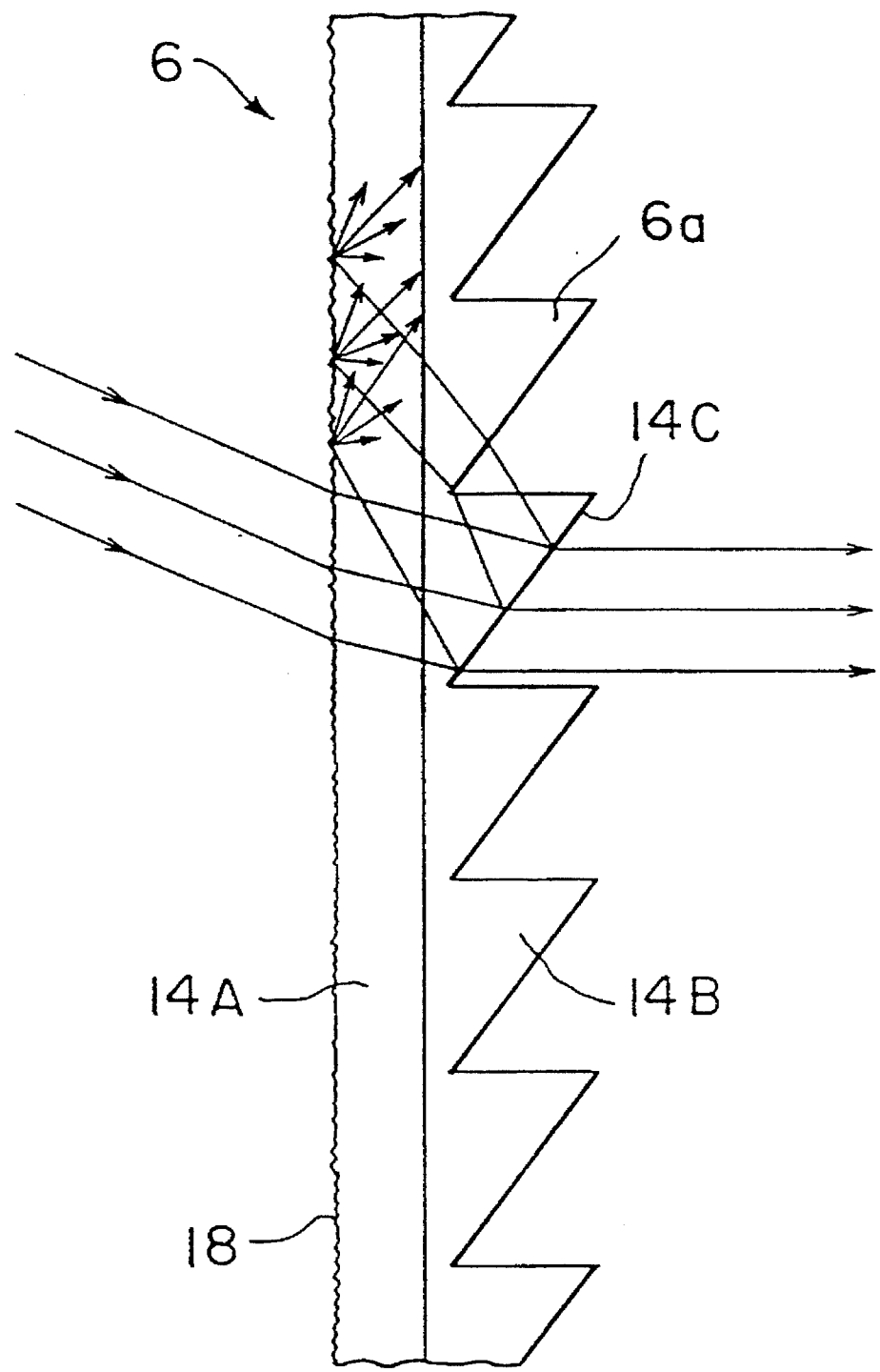
FIG. 22 is a view showing a first modification of the linear Fresnel lens sheet of the projection screen according to the present invention.

In FIG. 22, the linear Fresnel lens sheet 6 is composed of a base film 14A formed of polyester and a Fresnel lens portion 14B formed of urethane acrylate based UV-hardened resin. Further, the incident light side surface 18 of the base film 14A is processed to a matted surface 18 to diffuse light, by roughening the surface of the base film 14A or by applying a light diffusing ink or paint.

In the linear Fresnel lens sheet 6 shown in FIG. 22, the light passed through the circular Fresnel lens sheet 7 comes into the linear Fresnel lens sheet 6 through the smooth surface thereof, refracted and then outgoes. In this case, part of the light is reflected at the boundary surfaces 14C between the lens 6a and air, and returned toward the lens sheet again as stray light.

In this modification, however, since the stray light can be reflected toward the inside of the sheet again under diffusing conditions by the light incident surface of the base film 14A as shown in FIG. 22, the range from which the scattered light outgoes through the Fresnel lens portions 14B can be broadened, without allowing strong stray light to outgo locally, so that it is possible to eliminate the observable stray light. As a result, it is possible to weaken or eliminate the white band extending in the horizontal direction due to the stray light caused by the linear Fresnel lenses.

Figure 23:
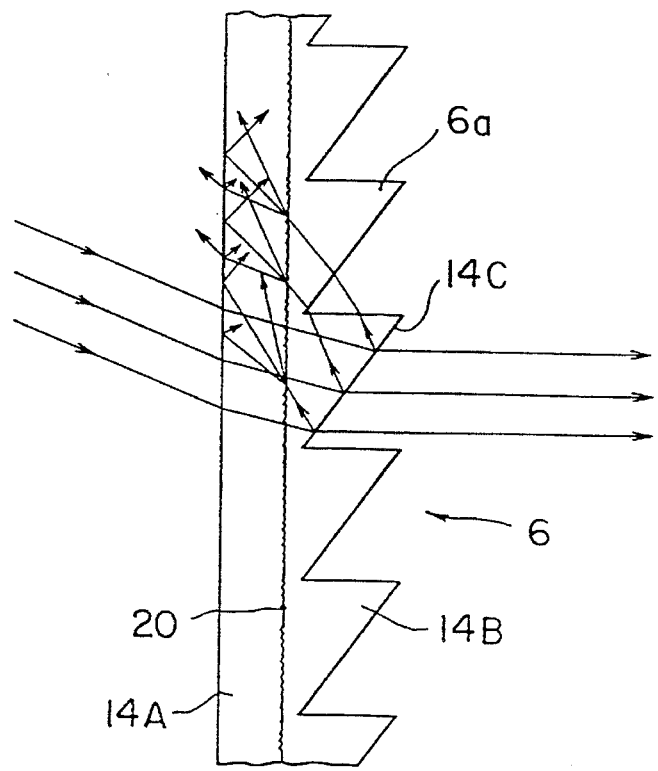
FIG. 23 is a view showing a second modification of the linear Fresnel lens sheet of the projection screen according to the present invention.

FIG. 23 shows a second modification. In this modification, a boundary surface between the base film 14A and the Fresnel lens portions 14B of the linear Fresnel lens sheet 6 is processed to a matted surface. In this matting processing, before the Fresnel lens portions 14B are molded by an UV-ray hardened resin, the base film 14A is matted by blasting, for instance.

In this modification, since the internally reflected light can be diffused by the matted surface 20 formed on the light incident side of the Fresnel lens portions 14B, it is possible to reduce or eliminate the white band in the outgoing light in the same way as in the first modification.

Figure 24:
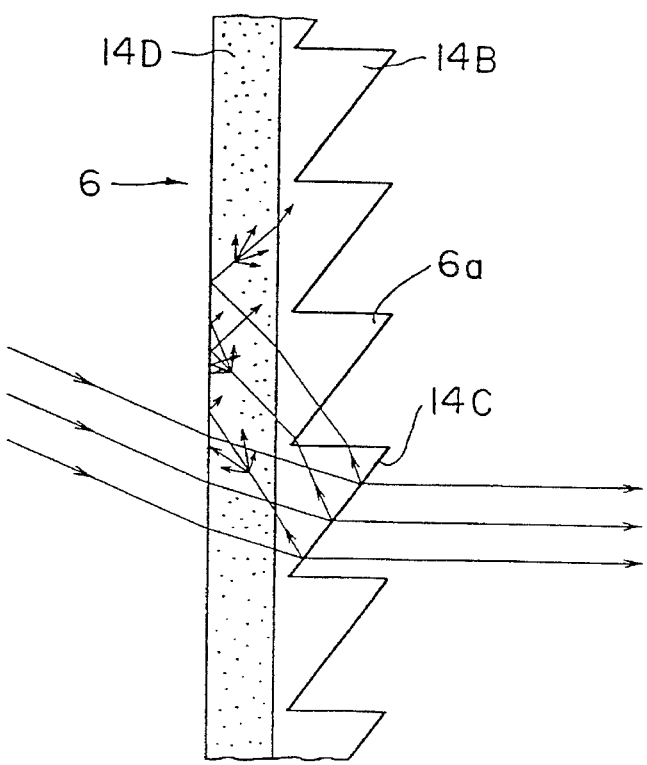
FIG. 24 is a view showing a third modification of the linear Fresnel lens sheet of the projection screen according to the present invention.

FIG. 24 shows a third modification. In the first and second modifications, the stray light is diffused by the matt-processed surface 18 or 20 obtained by roughening the surface or applying a light diffusing ink or paint. Without being limited only thereto, however, as far as the internal light reflected on the light outgoing side can be scattered when reflected again on the light incident side, it is possible to obtain the same effect by another method, as when a base film 14D is mixed with light diffusing substance in the linear Fresnel lens sheet 6, as shown in FIG. 24.

Figure 25:
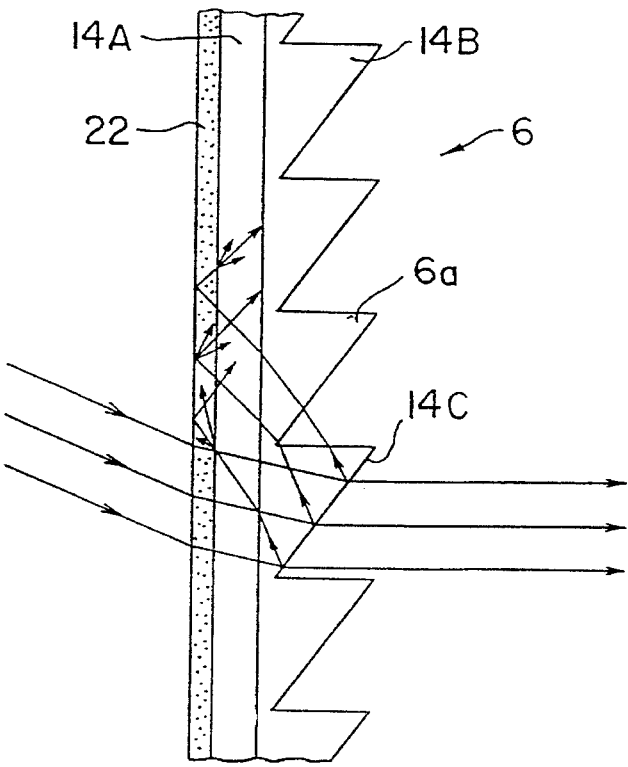
FIG. 25 is a view showing a fourth modification of the linear Fresnel lens sheet of the projection screen according to the present invention.

FIG. 25 shows a fourth modification, in which a light diffusing film 22 is additionally laminated onto the light incident surface side of the base film 14A of the linear Fresnel lens sheet 6.

Figure 26:
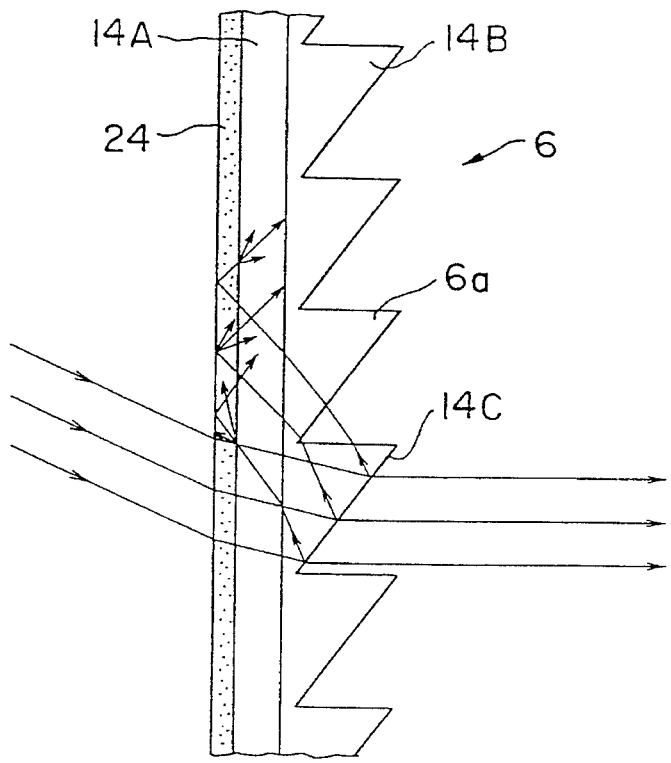
FIG. 26 is a view showing a fifth modification of the linear Fresnel lens sheet of the projection screen according to the present invention.

FIG. 26 shows a fifth modification, in which a light diffusing layer 24 is additionally formed by applying it on the light incident surface side of the base film 14A of the linear Fresnel lens sheet 6. Further, it is also preferable to diffuse the internally reflected light by two or more matt-processed surfaces.

In the above-description, where the light diffusing film 22 is laminated on the base film 14A or where the light diffusing layer 24 is formed by applying it on the base film 14A, it is preferable to determine the refractive index of the light diffusing film 22 or the light layer 24 lower than that of the base film 14A.

Further, as described above, when the light diffusing layer is additionally formed on the linear Fresnel lens sheet 6, the incident light is to be diffused doubly by the linear Fresnel lens sheet 6 and the lenticular lens sheet 5. Therefore, when the two light diffusing layer of both the lenticular lens sheet 5 and the linear Fresnel lens sheet 6 are positioned away from each other, the resolution power is degraded. Therefore, it is preferable to form the vertical light convergent type linear Fresnel lens sheet 6 as a film, without forming as a plate shape.

Further, when the obtained picture is white in color and low in contrast due to the reasons of the diffusion by the vertical light convergent type linear Fresnel lens sheet 6, of the UV-hardened resin, of the base film material, of the diffusion rate, etc., it is effective to reduce the light diffusion capability of the lenticular lens sheet 5 by that degree obtained by the linear Fresnel lens sheet 6, or to use a colored linear Fresnel lens sheet 6 or a colored lenticular lens sheet 5.

As described above, it is possible to reduce or eliminate the white band in picture, which is caused by the stray light produced by the light internally reflected by the boundary surfaces between the lenses 6a of the linear Fresnel lens sheet 6 and air.

Figure 27:
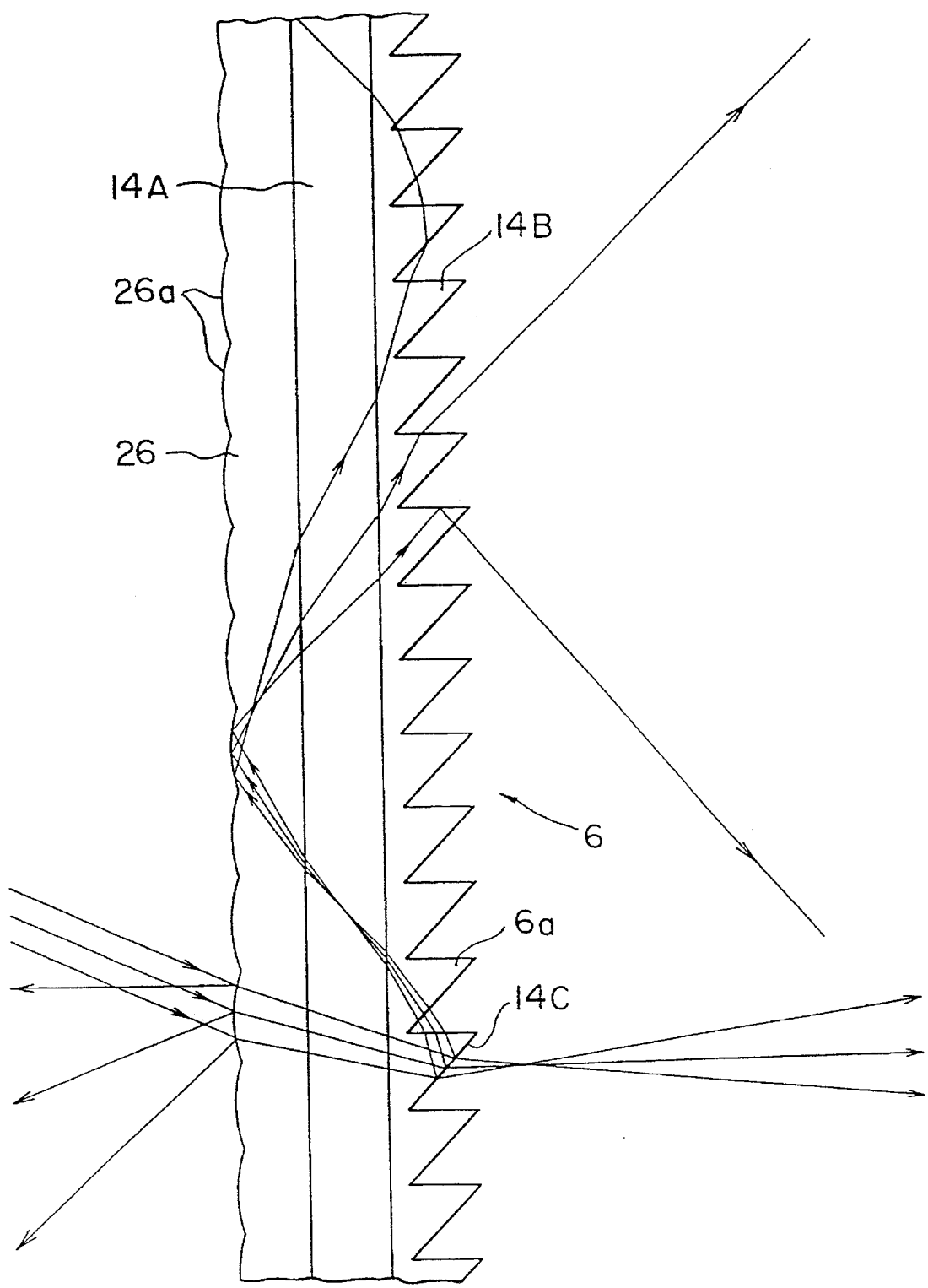
FIG. 27 is an illustration showing another method of diffusing stray light in the linear Fresnel lens sheet.

FIG. 27 shows a still another method of forming the light diffusing surfaces in the linear Fresnel lens sheet 6 to reduce the white band. In this method, a microlenticular lens sheet 26 is laminated on the light incident side surface of the base film 14 of the linear Fresnel lens sheet 6. The microlenticular lens sheet 26 has a number of microlenticular lenses 26a on the light incident side surface thereof. When the light reflected internally from the boundary surface 14C between the lens 6a and air reaches the inner surface of the microlenticular lens 26a, since the light reflected again thereat is diffused as shown in FIG. 27, so that it is possible to broaden the area from which the diffused light outgoes to the outside of the linear Fresnel lens sheet 6. Therefore, the diffused light is not easily observed by the viewer.

Here, it is preferable to determine the refractive index of the microlenticular lens 26 to be smaller than that of the base film 14A. This is because the availability of the incident light can be increased with decreasing refractive index of the microlenticular lens 26, with the result that the stray light can be easily passed through the light incident side of the lens 26.

Figure 28:
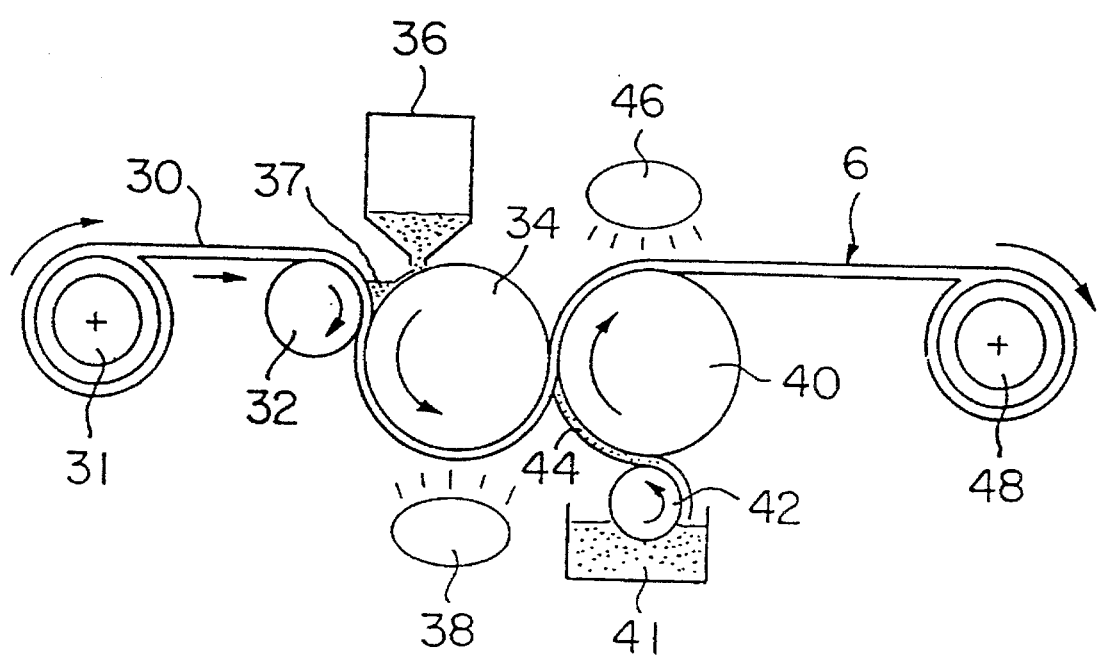
FIG. 28 is an illustration showing a method of manufacturing the linear Fresnel lens sheet.

FIG. 28 shows a method of manufacturing the linear Fresnel lens sheet shown in FIG. 27. An original film 30 for forming the base film 14A is paid off from a base film roller 31 in the arrow direction, and fed along an outer molding surface of a first molding roller 34 via a nip roller 32. Here, an UV-hardening type resin 37 is supplied from an UV-hardening type resin supplying source 36 to a gap between the molding roller 34 and the original film 30. Therefore, the resin 37 is molded into the shape of the linear Fresnel lens 6a in accordance with the molding surface of the molding roller 34. The molded resin 37 is irradiated with UV rays generated by an UV lamp 38 so as to be hardened and shaped.

The formed base film 30 (14A in FIG. 27) is then fed to the circumferential surface of a second molding roller 40 under pressure, while being nipped between the molding rollers 34 and 40. Here, another UV-hardening type resin 44 is applied onto the circumferential surface of the second molding roller 40 betweeen the surface of the roller 40 and the base film 30, with the use of a resin application roller 42 from another UV-hardening type resin supplying source 42. As a result, the resin 44 is formed into the shape of the microlenticular lens 26 in accordance with the molding surface of the second molding roller 40. The molded resin 44 is irradiated with UV rays generated by another UV lamp 46 so as to be hardened. After removing the base film 30 from the roller 40, the linear Fresnel lens sheet 6 as shown in FIG. 27 can thus be manufactured. The manufactured sheet 6 is taken up by a roller 48.

In the case of the linear Fresnel lens sheet that is not formed with microlenticular lens sheet 26, the right half process is unnecessary. Further, when the radiation-hardening type resin is used instead of the UV-hardening type resin, it is possible to radiate the resin with radial rays for hardening thereof.

Further, as the base film 14a, PET resin whose refractive index is 1.6 or more can be used. In this case, UV-hardening type resin of urethane acrylate family whose refractive index is about 1.49 can be used as the material of the linear Fresnel lenses 6a and the microlenticular lens sheet 26.

When the linear Fresnel lens sheet 6 is formed as described above, the shape reproducibility of the sheet 6 is excellent, and it is possible to form the sheet 6 thin, so that when the light diffusing means are provided as shown in FIGS. 22 to 27, it is possible to reduce blur of the picture. Furthermore, the manufacture by molding is suitable for mass production and makes the manufacturing cost low, as compared with the extrusion method.

Figure 29:
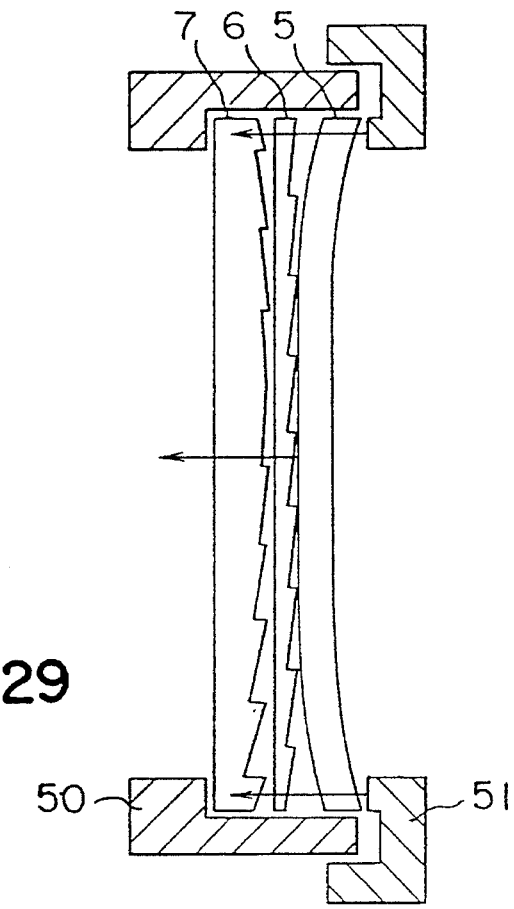
FIG. 29 is a cross-sectional view showing means for holding three lens sheets together.
Figure 30:
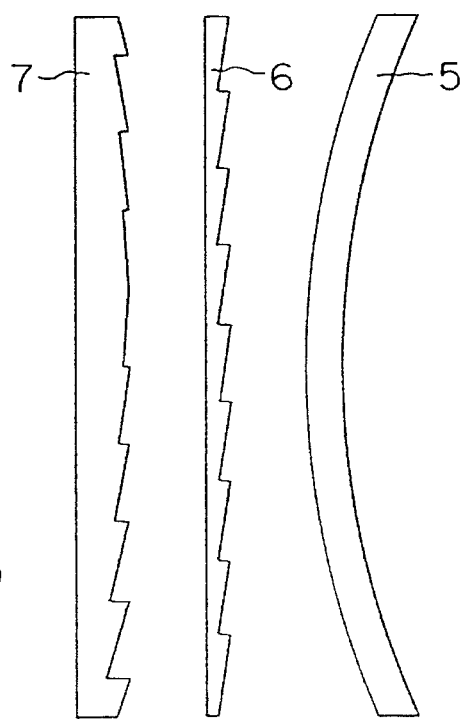
FIG. 30 is a side view showing the three lens sheets in separated conditions.

FIG. 29 shows a frame for fixing the three sheets of the circular Fresnel lens sheet 7, the linear Fresnel lens sheet 6 and the lenticular lens sheet 5 so as to construct the projection screen 2. As shown in FIG. 30, at least the lenticular lens sheet 5 of the three sheets 7, 6 and 5 is usually curved, so that it is possible to fix the middle linear Fresnel lens sheet 6 by utilization of the deformation of the curved sheet 5.

The lenticular lens sheet 5 is usually curved into concave shape on the light outgoing side in such a way that the center thereof is offset by 30 to 40 mm from the outer peripheral portion thereof. On the other hand, the circular Fresnel lens sheet 7 be curved fairly slightly as compared with that of the sheet 5. Rather, it is desirable that the circular Fresnel lens sheet 7 is curved into a convex shape on the light incident side in such a way that the center thereof is offset by about 2 mm from the outer peripheral portion thereof. However, it is not always necessary to curve the circular Fresnel lens sheet 7.

When the three sheets 5, 6 and 7 are attached to an outer peripheral frame 50 and further the a mounting frame 51 is fitted to the peripheral frame 50 in the arrow direction, since the middle linear Fresnel lens sheet 6 can be sandwiched between the two sheets 5 and 7, the three sheets are fixed to each other, so that the projection screen 2 can be constructed.

In the projection screen for rear projection television sets according to the present invention such that the projection point is offset from the central axis of the screen, it is possible to provide a projection screen sufficient in brightness, less in brightness non-uniformity, less in color shade, etc.

What is claimed is:

1. A projection screen for a rear projection type television set, having a plurality of lens sheets arranged in the order of a lenticular lens sheet, a linear Fresnel lens sheet, and a circular Fresnel lens sheet when seen from a viewer's side, wherein a lens angle $\psi$ of said linear Fresnel lens sheet is obtained in accordance with the following expressions:

$$\tan \psi = (\sin \theta_1 - \sin \theta_2)/((n_L^2 - (\sin \theta_1)^2)^{1/2} - \cos \theta_2) \quad (1)$$

$$S = ((v - PJ) \cos \phi)/(f_1^2 + (v - PJ)^2)^{1/2}) - \quad (2)$$
$$(\sin \phi) (n_c^2 - (v - PJ)^2/(f_1^2 + (v - PJ)^2))^{1/2}$$

$$\sin \theta_1 = S \cos \phi + \sin \phi (1 - S^2)^{1/2} \quad (3)$$

$$\theta_2 = \tan^{-1} ((v - h_f)/f_2) \quad (4)$$

$$h_f \leq 0$$

where:
- $\theta_1$: Incident light angle
- $\theta$: Outgoing light angle
- $\psi$: Linear Fresnel lens angle
- $n_L$: Linear Fresnel lens refractive index
- $\phi$: Circular Fresnel lens angle
- $v$: Vertical coordinate value of linear Fresnel lens
- $n_c$: Circular Fresnel lens refractive index
- $f_1$: Projection distance
- $f_2$: Vertical light converging distance
- PJ: Vertical coordinate value of light source (A) (CRT)
- $h_f$: Vertical coordinate value of image formation point.

2. The projection screen of claim 1, wherein said linear Fresnel lens sheet and said circular Fresnel lens sheet are arranged by directing lens formation surfaces thereof toward the viewer.

3. A projection screen for a rear projection type television set, having a plurality of lens sheets in the order of a lenticular lens sheet, a linear Fresnel lens sheet, and a circular Fresnel lens sheet when seen from a viewer's side, said circular Fresnel lens sheet having a refractive index larger than that of said linear Fresnel lens sheet.

4. The projection screen of claim 3, wherein said linear Fresnel lens sheet and said circular Fresnel lens sheet are arranged by directing lens formation surfaces thereof toward the viewer.

5. A projection screen for a rear projection type television set, having a plurality of lens sheets arranged in the order of a lenticular lens sheet, a linear Fresnel lens sheet in the form of a film, and a circular Fresnel lens sheet when seen from a viewer's side, wherein at least said lenticular lens sheet and said circular Fresnel lens sheet are curved, and said linear Fresnel lens sheet is sandwiched between said circular Fresnel lens sheet and said lenticular lens sheet.

6. A projection screen for a rear projection type television set, having a plurality of lens sheets arranged in the order of a lenticular lens sheet, a linear Fresnel lens sheet in the form of a film, and a circular Fresnel lens sheet when seen from a viewer's side, wherein said linear Fresnel lens sheet is composed of a base film and a lens group formed on said base film, said lens group comprising at least one of ultraviolet-ray hardening type resins and electron-beam hardening type resins.

7. The projection screen of claim 6, wherein said linear Fresnel lens sheet film is formed with a matted surface on a light incoming surface of said base film, to diffuse internally reflected stray light.

8. The projection screen of claim 6, wherein said linear Fresnel lens sheet is formed with a matted surface on a boundary surface between said base film and said lens group, to diffuse internally reflected stray light.

9. The projection screen of claim 6, wherein said linear Fresnel lens sheet further comprises a microlenticular lens sheet formed on a light incoming surface of said base film in such a way that said microlenticular lens is arranged in parallel to the lenses of the linear Fresnel lens sheet, to diffuse internally reflected stray light.

* * * * *